(12) United States Patent
Bauer et al.

(10) Patent No.: US 11,009,486 B2
(45) Date of Patent: May 18, 2021

(54) ACCURATELY CALCULATING ACOUSTIC TIME-OF-FLIGHT

(71) Applicant: Ventana Medical Systems, Inc., Tucson, AZ (US)

(72) Inventors: Daniel Bauer, Tucson, AZ (US); Michael Otter, Tucson, AZ (US); Benjamin Stevens, Oro Valley, AZ (US)

(73) Assignee: Ventana Medical Systems, Inc., Tucson, AZ (US)

(*) Notice: Subject to any disclaimer, the term of this patent is extended or adjusted under 35 U.S.C. 154(b) by 390 days.

(21) Appl. No.: 15/624,694

(22) Filed: Jun. 15, 2017

(65) Prior Publication Data

US 2017/0284969 A1    Oct. 5, 2017

Related U.S. Application Data

(63) Continuation of application No. PCT/EP2015/080252, filed on Dec. 17, 2015.

(60) Provisional application No. 62/093,173, filed on Dec. 17, 2014.

(51) Int. Cl.

| | | |
|---|---|---|
| *G01N 33/48* | (2006.01) | |
| *G01N 33/50* | (2006.01) | |
| *G01N 29/024* | (2006.01) | |
| *G01N 29/07* | (2006.01) | |
| *G01N 29/44* | (2006.01) | |
| *G01N 1/30* | (2006.01) | |

(52) U.S. Cl.
CPC .......... *G01N 29/024* (2013.01); *G01N 29/07* (2013.01); *G01N 29/4418* (2013.01); *G01N 1/30* (2013.01); *G01N 2291/012* (2013.01); *G01N 2291/02475* (2013.01)

(58) Field of Classification Search
CPC combination set(s) only.
See application file for complete search history.

(56) References Cited

U.S. PATENT DOCUMENTS

| | | |
|---|---|---|
| 5,996,415 A | 12/1999 | Stanke et al. |
| 6,291,180 B1 | 9/2001 | Chu |
| 10,267,769 B2 | 4/2019 | Otter et al. |
| 2009/0226059 A1 | 9/2009 | Levenson et al. |
| 2013/0224791 A1 | 8/2013 | Taft et al. |
| 2014/0107954 A1 | 4/2014 | Lih et al. |
| 2019/0086300 A1 | 3/2019 | Chafin et al. |

FOREIGN PATENT DOCUMENTS

WO    2011109769 A1    9/2011

OTHER PUBLICATIONS

Bauer et al, 2014, "Dynamic Subnanosecond Time-of-Flight Detection for Ultra-precise Diffusion Monitoring and Optimization of Biomarker Preservation", Proceedings of SPIE, 9040:904001B1-90400B10.
Bussolati et al, 2011, "Formalin Fixation at Low Temperature Better Preserves Nucleic Acid Integrity", PLoS ONE, 6(6):e21043 (8 pages).
International Preliminary Report on Patentability dated Jun. 20, 2017 in corresponding PCT/EP2015/080252, pp. 1-11.
International Search Report and Written Opinion dated Jun. 10, 2016 in corresponding PCT/EP2015/080252, pp. 1-17.
Examination Report No. 1 for Australian Patent Application No. 2019208143, dated Jul. 30, 2020.
A Feasible and Accurate Technique for Determining the Time-of-Flight in Ultrasonic Distance Measurements, 50th International Symposium ELMAR-2008, Sep. 10-12, 2008, Zadar, Croatia, pp. 337-340.

*Primary Examiner* — Russell S Negin

(74) *Attorney, Agent, or Firm* — Charney IP Law LLC; Thomas M. Finetti

(57) ABSTRACT

The subject disclosure presents systems and computer-implemented methods for determining an acoustic time-of-flight (TOF) of sound waves through a sample material with greater accuracy and in a more repeatable fashion, by invoking one or more of an envelope generation for an error function, fitting a non-linear curve to an ultrasound frequency sweep, or performing a clustered piece-wise linear regression on individual linear parts of the ultrasonic frequency sweep. The systems and methods are useful for, among other things, monitoring diffusion of fluids through porous materials, such as tissue samples.

26 Claims, 21 Drawing Sheets

ACCURATELY CALCULATING ACOUSTIC TIME-OF-FLIGHT

CROSS-REFERENCE TO RELATED APPLICATIONS

This is a continuation of International Patent Application No. PCT/EP2015/080252 filed Dec. 17, 2015, which claims priority to and the benefit of U.S. Provisional Patent Application No. 62/093,173, filed on Dec. 17, 2014, both of which applications are incorporated by reference herein.

BACKGROUND OF THE SUBJECT DISCLOSURE

Field of the Subject Disclosure

The present subject disclosure relates to acoustic analysis of materials, including, for example, biological samples. More particularly, the present subject disclosure relates to systems and methods for measuring time-of-flight of acoustic signal traversing through a material.

Background of the Subject Disclosure

Measuring a time-of-flight of an acoustic signal through a material is used in a number of commercial fields. Some fields rely on very small changes in time-of-flight.

Current methods used to calculate acoustic time-of-flights are sometimes prone to aberrantly high or low readings due to a variety of environmental or systemic factors, especially at sub-nanosecond scales. Measurement errors at such short observed TOFs can be problematic. For example, US 2013/0224791 discloses methods of monitor diffusion of fixative during tissue processing. For standard core biopsies, the total TOF measured is less than 100 nanoseconds. Errors even on a nanosecond scale in such a context are unacceptable.

Existing methods of minimizing errors simply fill and/or smooth the results to avoid the effects of these spurious signals. However, such methods do not completely discount the effect of an aberrant reading on the TOF measurement, and thus are still prone to unacceptable errors. To the best of the present inventors' knowledge, no methods exist to adequately correct errors in TOF measurements made at a sub-nanosecond scale.

SUMMARY OF THE SUBJECT DISCLOSURE

The subject disclosure relates to systems and computer-implemented methods for improved determination of acoustic time-of-flight (TOF) of sound waves in one of three ways: (1) calculating an envelope for an error function enabling a more accurate determination of a minimum of the error function; (2) fitting ultrasound frequency sweep data to a plurality of simulated TOF frequency sweeps, with the TOF being calculated directly from the best fit; and/or (3) performing a linear regression analysis on individual linear parts of the ultrasonic frequency sweep, enabling identification of abnormal sections of the frequency sweep that may represent errors in the TOF calculation.

In one exemplary embodiment, the subject disclosure provides a computer-implemented method for accurately calculating a time-of-flight of an acoustic signal traversing through a material, the method including obtaining an error function of a frequency sweep of the acoustic signal, and generating an envelope of the error function, wherein the time-of-flight is based on a minimum of the error function.

In another exemplary embodiment, the subject disclosure provides a computer-implemented method for accurately calculating a time-of-flight of an acoustic signal traversing through a material, the method including generating a frequency sweep of the acoustic signal, and comparing a candidate triangle wave with the frequency sweep over a plurality of candidate frequencies and a plurality of candidate phases, wherein the time-of-flight is calculated based on a closest-matching candidate frequency and candidate phase.

In yet another exemplary embodiment, the subject disclosure provides a computer-implemented method for accurately calculating a time-of-flight of an acoustic signal traversing through a material, the method including determining a plurality of individual linear sections of an ultrasound frequency sweep of the acoustic signal, and performing a linear regression on each individual linear section to determine an average slope, wherein the time-of-flight is calculated based on the average slope Each of these methods may be implemented in an electronic TOF acquisition system as further described herein.

DETAILED DESCRIPTION OF THE SUBJECT DISCLOSURE

TOF: Time of Flight
I. Technical Implementation

Figure 9A:
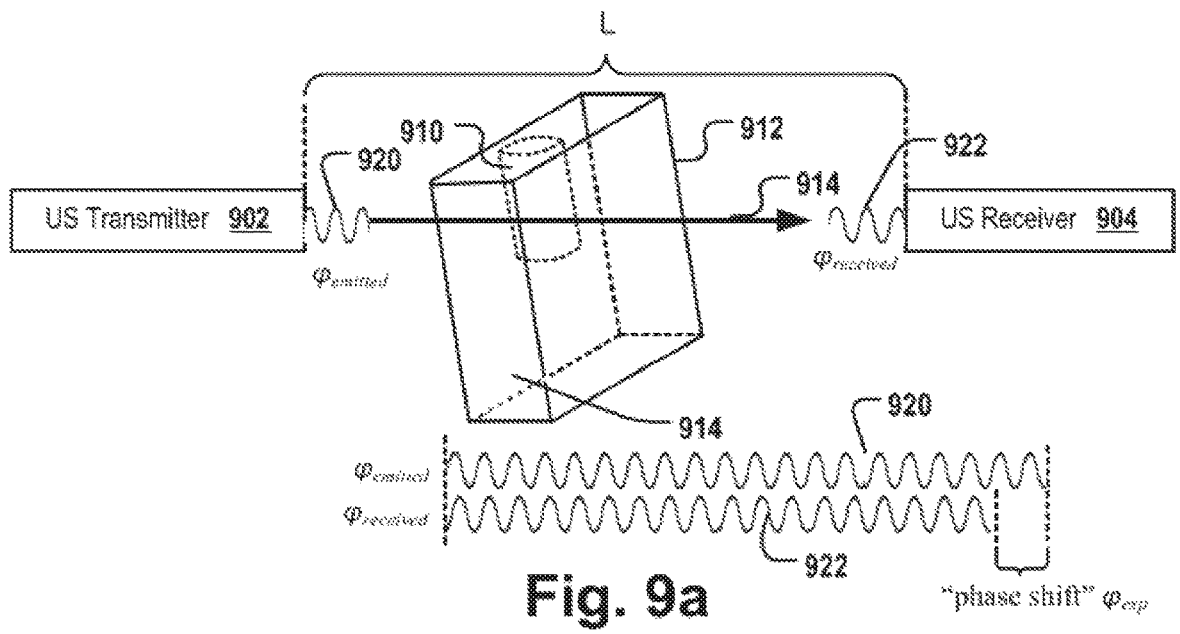
FIGS. 9A-9B show a system comprising a transmitter and a receiver pair for measuring TOF via phase shifts, wherein the relative position of the transducer pair and the sample may be modified for creating a reference TOF value that may be used for compensating TOF variations caused by temperature fluctuations.

FIG. 9a shows a system for monitoring the time-of-flight of an ultrasound signal according to embodiments of the invention. An ultrasound-based time-of-flight (TOF) monitoring system may comprise one or more pairs of transducers (e.g. TA0040104-10, CNIRHurricane Tech) for performing the time-of-flight measurements based on a phase shift of the ultrasound signals. In the embodiment depicted in FIG. 9a, the system comprises at least one pair of transducers consisting of an ultrasound ("US") transmitter 902 and an ultrasound receiver 904 which are spatially aligned to each other such that a tissue sample 910 which is placed in the beam path 914 from the transmitter to the receiver is located at our close to the common foci of said two transducers 902, 904. The tissue sample 910 can be contained, for example, in a sample container 912 (e.g. a standard histological cassette like "CellSafe 5" of CellPath or a biopsy capsule like "CellSafe Biopsy Capsules" of CellPath) that is filled with a fixation solution. Phase-shift based TOF measurements may be performed before at, or after the biopsy capsule 912 is filled with the fixation solution. The one transducer acting as the transmitter sends out an acoustic pulse that traverses the tissue and is detected by the other transducer acting as the receiver. The total distance between two transducers constituting a transmitter-receiver transducer pair is referred to as "L". The total time the ultrasound signal needs to traverse the distance between the transmitter 902 and the receiver 904 may be referred to as time-of-flight of said signal. The transmitter 902 may be focused, for example, at 4 MHz and support a frequency sweep range of 3.7-4.3 MHz.

According to embodiments, the distance L is assumed here to be known, at least approximately. For example, the distance of the transducers may be accurately measured (e.g. by optic, ultrasound based or other measurement techniques) or may be disclosed by a manufacturer of the acoustic monitoring system.

The transmitting transducer 902 is programmable with a waveform generator (e.g. AD5930 from Analog Devices) to transmit a sinusoidal wave (or "sinusoidal signal") for a defined frequency for a defined time interval, e.g. several hundred microseconds. That signal is detected by the receiving transducer 904 after traversing the fluid and/or tissue. The received ultrasound signal 922 and the emitted (also referred to as "transmitted") sinusoid signal 920 are compared electronically with a digital phase comparator (e.g. AD8302, Analog Devices).

A "received" "signal" (or wave) as used herein is a signal whose properties (phase, amplitude, and/or frequency, etc.) are identified and provided by a transducer, e.g. receiver 904, that receives said signal. Thus, the signal properties are identified after said signal has passed a sample or any other kind of material.

A "transmitted" or "emitted" "signal" (or wave) as used herein is a signal whose properties (phase, amplitude, and/or frequency, etc.) are identified by a transducer, e.g. transmitter 902 that emits the signal. Thus, the signal properties are identified before the signal has passed a sample or any other kind of material.

For example, the transmitted signal may be characterized by signal properties identified by the transmitting transducer, the received signal may be characterized by signal properties measured by the receiving transducer, whereby the transmitting and the receiving transducer are operatively coupled to a phase comparator of the acoustic monitoring system.

The output of the phase comparison is allowed to stabilize before the output is converted, e.g. with an integrated analog to digital converter, to a voltage signal that indicates a phase shift $\varphi_{exp}$ between the emitted and the received signals.

According to embodiments, this process of determining a phase shift $\varphi_{exp}$ between the emitted signal 920 and the received signal 922 is repeated at multiple acoustic frequencies across a frequency range (also referred to e.g. as "frequency sweep") to build up the phase relationship between the input and output sinusoids across said frequency range. For example, the whole bandwidth of the transducers 902, 904 or parts of said bandwidth may be used as the frequency range. For example, the plurality of predefined frequencies may comprise 1001 different frequency values that are scanned as described herein for embodiments of the invention. The phase shift $\varphi_{exp}$ received for each of said multiple frequencies is measured in a measuring phase which typically takes less than a second. Then, in a post-processing phase, the obtained phase shifts are used for computing a TOF value for the beam path 914 traversing the tissue sample 910 that may be indicative of transit times with subnanosecond accuracy.

Figure 9B:
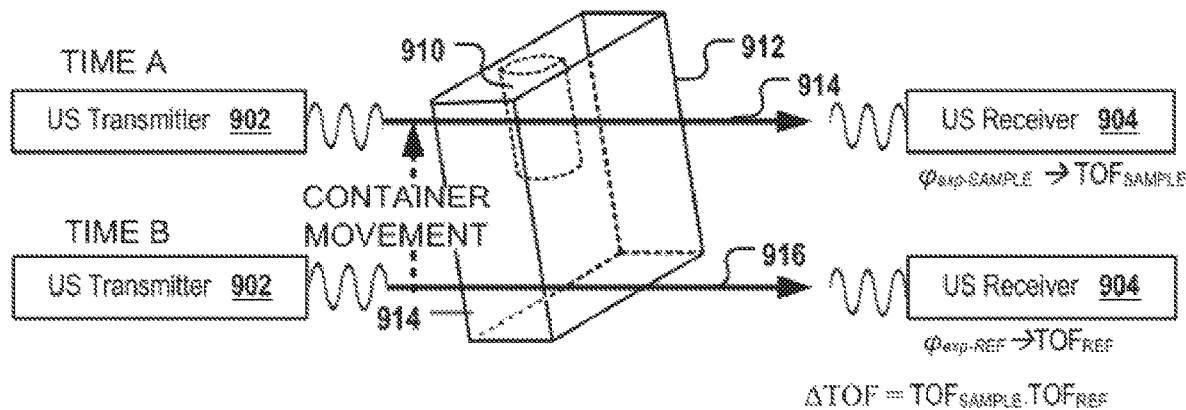

FIG. 9b depicts an embodiment of a system for monitoring the time-of-flight of an ultrasound signal that may in addition be capable of compensating for TOF measurement errors caused e.g. by temperature fluctuations of the container comprising the sample. In this embodiment, the one or more transducer pairs 902, 904 and the sample container 912 can be moved relative to each other. Preferentially, the system comprises a container holder capable of repositioning the container 912 such that the US beam traverses a region 914 of the container that solely comprises the fixation solution but not the tissue.

At a time A, when the tissue is not yet surrounded by any fixation solution or when the fixation solution has not yet diffused into the sample yet, a multitude of frequencies may be traversed for measuring a respective multitude of phase shifts $\varphi_{exp}$ as described for FIG. 9a. The measurement data is then used for computing a final TOF value for said time A and for the particular section of the sample that is traversed by the beam path 914. The TOF acquired at time A thus is indicative of physical properties of the sample. At further moments in time A1, A2, A3, . . . , the tissue sample has already been submerged in fixation solution and the fixation solution has already diffused at least partially into the sample. The multitude of frequencies may be traversed for each further moments in time A1, A2, A3, . . . for measuring a respective multitude of phase shifts $\varphi_{exp}$ as described for FIG. 9a. The measurement data is then used for computing respective final TOF values for each of said times A1, A2, A3. The TOF acquired at times A1, A2, A3 . . . thus is indicative of physical properties of the sample and of the fixation fluid an of the degree of diffusion of the fluid into the sample.

At a time B, that may be before or after the time A, or any of the further times A1, A2, A3, the sample box 912 is moved relative to the transducer pair 902, 904 such that the beam path 916 after said movement traverses a section of the sample box 912 that solely comprises the fixation solution, not the tissue sample. The multitude of frequencies may be traversed for measuring a respective multitude of phase shifts $\varphi_{exp}$ as described for FIG. 9a but for beam path 916 rather than 914. The measurement data is then used for computing a final TOF value for said time B and that is used as a reference value ($TOF_{REF}$). The reference TOF value can be subtracted from the TOF value obtained for times A, A1, A2, . . . , or A3 for obtaining a "delta TOF" that is corrected for various environmental effects such as temperature fluctuations within the sample container 912. Thus, computing a "delta TOF" may allow compensating for environmental fluctuations, thereby further increasing the accuracy of TOF measurements. The speed of sound in fluids is sensitive to thermal fluctuations which could significantly alter the detected TOF.

A "delta TOF" of the TOFs obtained for times A and B caused by a biological sample 910 of about 6 mm may lie, for example, within the range of 5-50 ns.

According to preferred embodiments, time A and time B are temporarily separated by less than 5 minutes, preferentially less than one minute, and more preferentially less than 30 seconds.

TOF typically is not directly recorded, but instead is estimated by comparing the phase of transmitted and received acoustic waves. In practice, an experimental frequency sweep is transmitted by a transmitter through the medium and detected by a receiver. The phase of the transmitted waves (as programmed by the electronics of the transmitter and before they have traversed any object outside the transmitter) and received waves is compared and transformed to a temporal phase shift. A simulation is then run to model candidate temporal phase shifts at a variety of candidate TOFs, and an error between the candidate and experimental temporal phase shifts is generated and plotted as an error function. The TOF resulting in the minimum of the error function is selected as the "observed" TOF.

For example, a post-processing algorithm has been developed that is capable of robustly detecting subnanosecond TOF values in tissue samples immersed in fixative solution. A transmitting transducer programmed with a programmable waveform generator transmits a 3.7 MHz sinusoidal signal for 600 µs. That pulse train is detected by a receiving transducer after traversing the fluid and tissue, and the received and transmitted US sinusoids are then compared electronically with a digital phase comparator. The output of the phase comparator is queried with an analog to digital converter and the average recorded. The process is repeated at multiple acoustic frequencies (v). Given the central frequency (4.0 MHz) and fractional bandwidth (~60%) of the transducers, a typical sweep ranges from 3.7-4.3 MHz with the phase comparator queried every 600 Hz.

For example, given a frequency range of the frequency sweep of 0.6 MHz=600000 Hz and a frequency-step-width of e.g. 600 Hz, there will be 1001 discrete frequencies to scan. In the following, the number of frequencies scanned when traversing a frequency sweep is referred to as "N". For each of the scanned frequencies, each transmitter may transmit an ultrasound signal to the receiver at least until the emitted signal has stabilized at the respective frequency and until the receiver could record a phase of the received signal for said particular frequency. This ensures that for each of the N frequency, a respective phase shift (or "temporal phase shift") between the transmitted (see e.g. 920 in FIG. 9a) and the received (see e.g. 922 in FIG. 9a) signal were obtained. Said phase information can be used for computing the temporal phase shifts $\varphi_{exp}$ for each of the N frequencies in a post-processing phase.

Typically, the stabilization of the transmitter at a new frequency and a respective phase measurement may be performed very quickly. Thus, the whole frequency scan for the 1001 different ultrasound signal frequencies may be performed within about 1 second or less. A "scanned frequency" or "candidate frequency" as used herein is one of the plurality of N frequencies of the frequency sweep that are scanned.

According to embodiments, the determination of a TOF via a phase shift measurement may be based on the following equations: the total distance L between two transducers constituting a transmitter-receiver transducer pair can be written as the total number C of complete wavelengths λ of the ultrasound signal of a given candidate frequency in combination with a fraction n of said wavelength λ as: $L=(C+n)\lambda$, wherein C is the number of complete wavelength between the transmitter and the receiver, n is the fraction of a wavelength between the transmitter and the receiver that, when added to the C wavelength yields the total distance L between the transducers (see e.g. FIG. 9a). The distance L equals velocity multiplied by time so the TOF can be calculated as:

$$TOF = \frac{\text{distance}}{\text{sound-velocity}} = \frac{L}{c_s} = \frac{(C+n)\lambda}{c_s},$$

wherein $c_s$ is the velocity of ultrasound wave while traversing the tissue sample and the bulk fluid (e.g. histological fluid and/or a coupling fluid between the transmitter and the sample container) in the beam path between the transmitter and the receiver (in fact, the above formula may be used heuristically as the beam in some embodiments crosses not only the tissue sample, but also the bulk fluid between the transducers, but the effect of the bulk fluid can be ignored here as said effect may be canceled out later by subtracting the reference TOF (described e.g. in FIG. 9b) from the TOF value measured for a beam path passing the sample and some fluid volume).

In a further calculation step, the expression $c_s/\lambda$ is replaced by a frequency v of the signal for obtaining the following formula:

$$TOF = \frac{(C+n)}{v} = \frac{(C+2\mu\varphi)\lambda}{v},$$

which is solved for phase according to: $\varphi=2\mu(TOF(v)-C)$. By differentiating said formula with respect to ultrasound frequency, the following relation is obtained:

$$\frac{\partial\varphi}{\partial v} = 2\pi TOF.$$

Thus, the ultrasound signal's phase change per time divided by its respective frequency change per time is directly proportional to the absolute TOF.

According to embodiments, a known relation between phase and TOF at a given signal frequency is used, for each of the frequencies v scanned during a frequency sweep and for each of a plurality of candidate TOFs, to predicted a respective phase shift $\varphi_{exp}$, also referred to as "temporal phase shift", that depends on the current candidate frequency and on the current candidate TOF. The temporal phase shift is, for example, the shift of the phase measured at a particular one of the N scanned frequencies. Thus, for each of the N scanned frequency values, one respectively experimentally measured "phase shift" $\varphi_{exp}$ is measured.

According to embodiments, the voltage from the phase comparator is converted to a temporal phase shift, referred to as the experimentally determined phase ($\varphi_{exp}$) or "experimentally determined phase shift". As explained for FIG. 9a, the phase shift is the shift in phase between the transmitted and the received signal for a signal of a given frequency.

Next a brute force simulation is used to calculate what the observed phase frequency sweep would look like for different candidate TOF values. Candidate temporal phase values, as a function of input sinusoid frequency, are calculated according to Formula I:

$$\varphi_{cand}(TOF_{cand}, v) = \left| TOF_{cand} - rnd\left(\frac{TOF_{cand}}{T(v)}\right)T(v) \right|, \quad (I)$$

where $TOF_{cand}$ is a candidate TOF value in nanoseconds, T is the period of the input sinusoid in nanoseconds, rnd represents the round to the nearest integer function, and | . . . | is the absolute value symbol. For a given candidate TOF and frequency value (i.e. period), the term on the right represents how long it takes for the nearest number of cycles to occur. This value is subtracted from $TOF_{cand}$ to calculate the temporal phase, into or up to, the next complete cycle. Phase values are thus computed for multiple candidate TOF values initially ranging from 10-30 μs with 200 ps spacing.

Thus, according to embodiments, the set of candidate TOFs may range from 10 μs to 30 μs with 200 ps spacing between the values. In this embodiment, the number M of candidate TOFs may comprise 100.000 candidate TOFs. Thereby, M is a numeric number indicating the number of predefined candidate TOFs having been derived e.g. from the literature or other sources of information.

For example, for N candidate frequencies and M candidate TOFs, N×M "modeled", "expected", "simulated" or "predicted" phases $\varphi_{cand}$ are computed. For F=1001 and M=25.000, 25.025.000 "predicted" or "candidate" phases $\varphi_{cand}$ would be computed.

According to embodiments, the set of candidate TOFS is chosen such that subsequent candidate TOFs are spaced less than 10 ns, more preferentially less than 1 ns, more preferentially less than 500 ps and more preferentially less than 250 ps apart from each other. For example, the number M of candidate TOFs may be greater than 10.000, more preferentially greater than 20.000, more preferentially greater than 50.000 and more preferentially greater than 100.000. The higher the number of candidate TOFs and the closer the subsequent candidate TOFs are to each other, the higher the resolution of the method of identifying the "true TOF".

According to embodiments, the candidate TOF range is a function of the distance L between the transmitter and the receiver. For example, the distance L=sound velocity*time, whereby the sound velocity range in relevant fluids and/or tissues is, for example, between 1-2 mm/μs. The candidate TOF range could then be defined as a set of candidate TOFs fulfilling the following formula:

$$\frac{L}{2\mu s} < TOF_{cand} < \frac{L}{1\mu s}.$$

The range may be different for other Ls and/or other types of fluid, and may in particular be broader for covering multiple different fluids and/or tissue types. The distance between individual candidate TOFs may be chosen as described above.

The error between experimental phase shift $\varphi_{exp}$ and any one of the candidate phase shifts $\varphi_{cand}$ of each of the plurality of N frequencies scanned during a frequency sweep is calculated in a least-squares sense for individual candidate TOF values by Formula II:

$$\text{Error}(TOF_{cand}) = \sum_{v=1}^{N} (\varphi_{cand}(TOF_{cand}, v) - \varphi_{exp}(v)), \quad (II)$$

where N is the total number of frequencies in the sweep. The normalized error function, as a function of candidate TOF, resembles an optical interferogram (i.e., a recording of an interference pattern generated in an interferometer). For example, each feature has a width of one acoustic period (T=¼ MHz=250 ns). Maximum error function indicates the candidate phase frequency sweep has equal wavelength but is out of phase with the experimental phase frequency sweep. Conversely, when error is minimized the two are completely harmonized and thus the reconstructed TOF is registered as the global minimum of the error function according to Formula III:

$$TOF_{recon} = \arg\min_{TOF_{cand}}(\text{Error}). \quad (III)$$

Thus, a single "true TOF" $TOF_{recon}$ may be identified from the phase shift data of all frequencies of the frequency sweep, because formula II sums the error over all frequencies. The candidate phase and candidate TOF that minimize the error function are identified and used as the "$TOF_{recon}$". A "true TOF" may be considered as the transit time of an acoustic pulse to be transmitted by the transmitting transducer and subsequently received by the receiving transducer, traversing a distance of L that is determined in accordance with embodiments of the invention and which reflects the actual ("real") transit time very accurately.

This technique of digitally comparing acoustic waves results in high precision due to the sharpness of the center trough, and results in exceptionally well-matched candidate and experimental phase frequency sweeps.

Figure 1A:
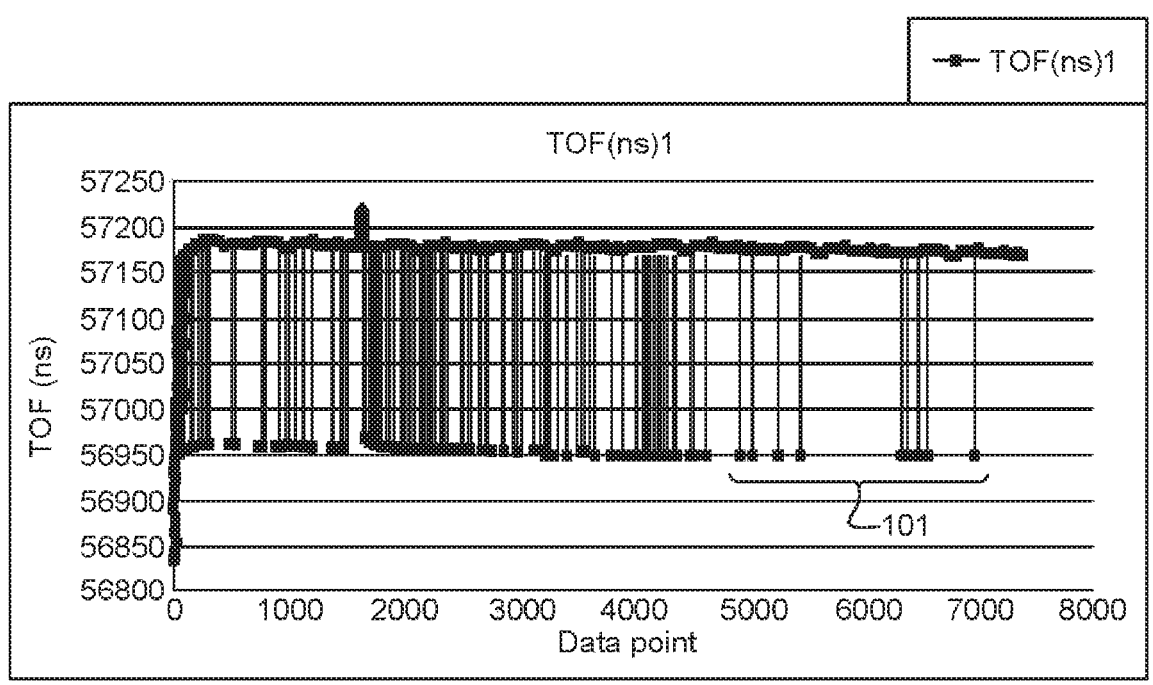
FIGS. 1A-1C depict errors that are corrected by exemplary embodiments of the subject disclosure disclosed herein.
Figure 1B:
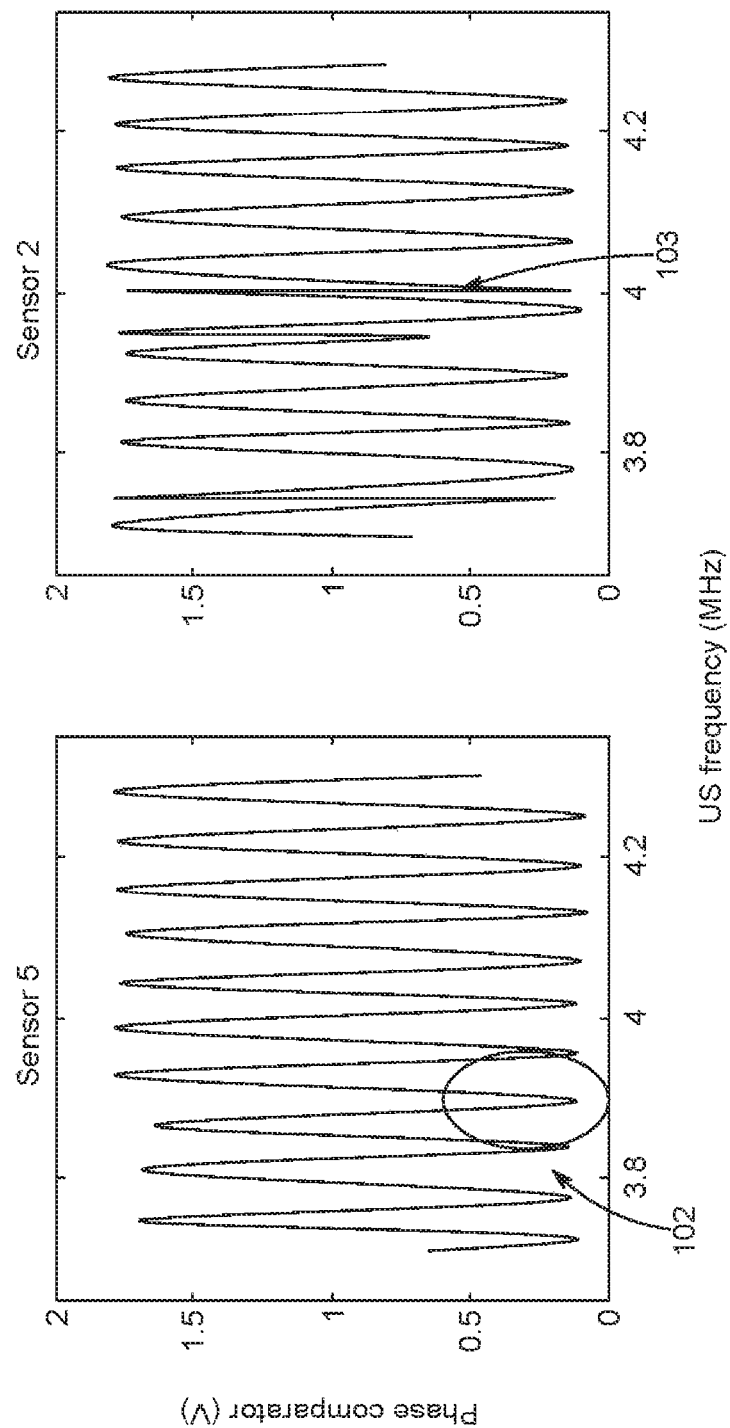
Figure 1C:
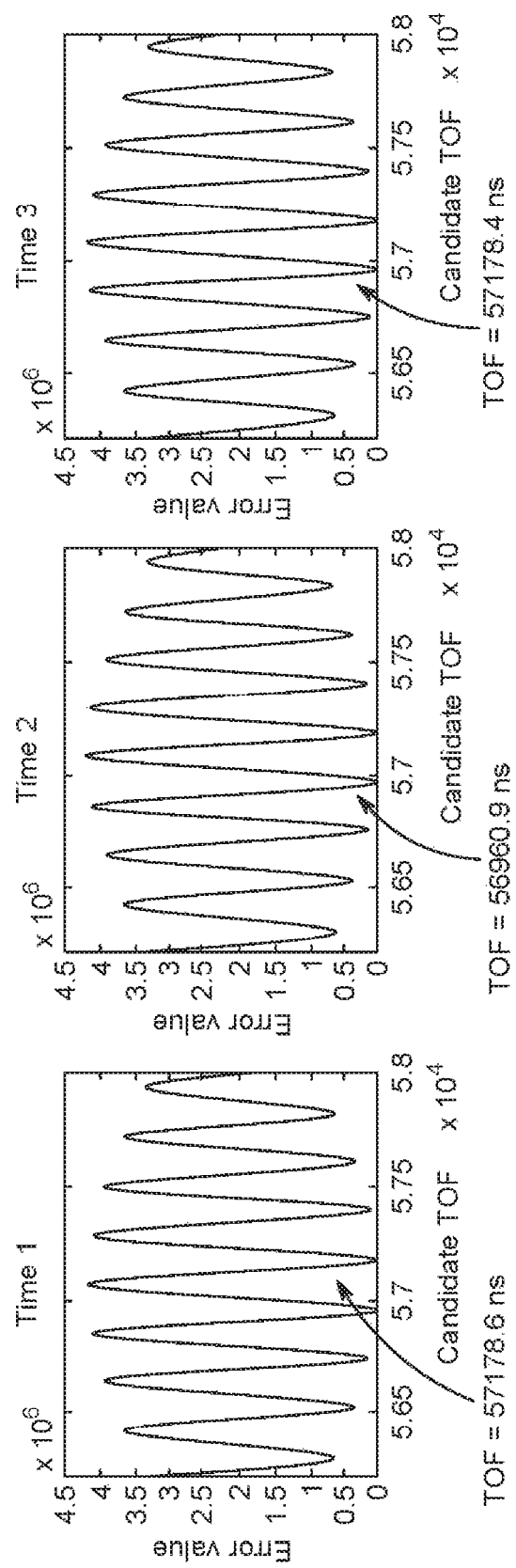

Unfortunately, some factors can corrupt the frequency sweep readings, such as movement of the sample during transmission, environmental fluctuations, and anomalies with the electronics. This can manifest as "jumps" in the recorded TOF, the cause of which can be traced back to the minima of the error function jumping between local minima, or phase discontinuities and irregularities within the phase output of the original acoustic frequency sweep. FIG. 1A depicts a jumpy TOF signal produced by such methods. Erroneous TOF values 101 are identified in FIG. 1A. FIG. 1B depicts errors in an output of a phase comparator used to acquire the TOF signal. Errors in phase doubling back on itself 102 and discontinuities 103 are identified. FIG. 1C depicts an error function jumping between adjacent local minima (based on the TOF values) over three different time points.

The subject disclosure solves the above-identified problems by presenting systems and computer-implemented methods for determining an acoustic time-of-flight (TOF) of sound waves through a sample material with greater accuracy and in a more repeatable fashion, by invoking one or more of an envelope generation for an error function, fitting a non-linear curve to an ultrasound frequency sweep, or performing a clustered piece-wise linear regression on individual linear parts of the ultrasonic frequency sweep.

II. Systems and Methods

In an embodiment, a system of calculating TOF is provided, said system comprising a signal analyzer containing a processor and a memory coupled to the processor, the memory to store computer-executable instructions that, when executed by the processor, cause the processor to perform operations including one or more of:
(1) an envelope method of TOF calculation;
(2) a curve-fitting method of TOF calculation; and
(3) a linear regression method of TOF calculation;
each as discussed in further detail below.

A data input into the signal analyzer is an acoustic data set generated by an acoustic monitoring system, said acoustic data set generated by transmitting an acoustic signal so that the acoustic signal encounters a material of interest, and then detecting the acoustic signal after the acoustic signal has encountered the material of interest. Thus, in a further embodiment, a system is provided comprising a signal analyzer as disclosed herein and an acoustic monitoring system discussed in further detail below. Additionally or alternatively, a system may be provided comprising a signal analyzer as disclosed herein and a non-transitory computer readable medium comprising an acoustic data set obtained from an acoustic monitoring system as disclosed herein. In an embodiment, the acoustic data is generated by frequency sweep transmitted and received by the acoustic monitoring system. As used herein, the term "frequency sweep" shall refer to a series of acoustic waves transmitted at fixed intervals of frequencies through a medium, such that a first set of acoustic waves is emitted through the medium at a fixed frequency for a first fixed duration of time, and subsequent sets of acoustic waves are emitted at fixed frequency intervals for subsequent—preferably equal—durations.

In some embodiments, the system is adapted for monitoring diffusion of a fluid into a porous material. In such an embodiment, a system may be provided comprising: (a) a signal analyzer as discussed herein; (b) an acoustic monitoring system as discussed herein and/or a non-transitory computer readable medium comprising an acoustic data set generated by said acoustic monitoring system; and (c) an apparatus for holding a porous material immersed in a volume of a fluid. In an embodiment, said system is for monitoring diffusion of a fixative into a tissue sample.

Figure 2:
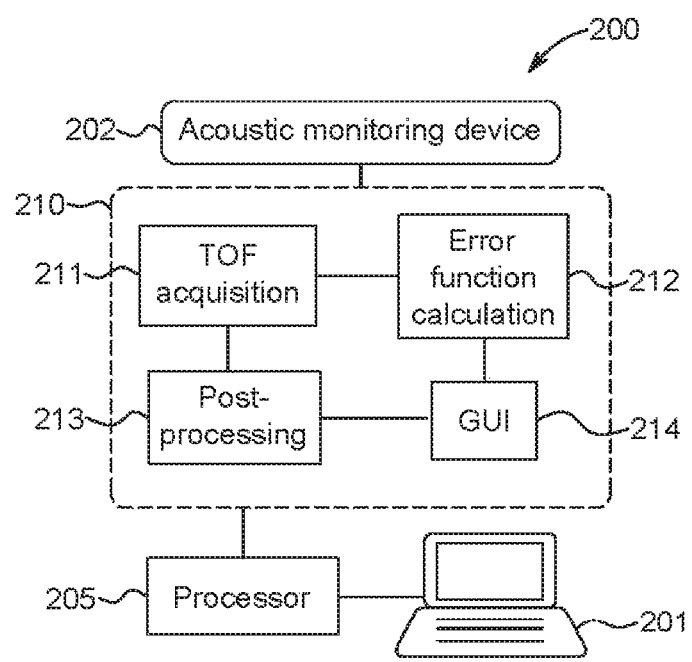
FIG. 2 depicts a system for accurately calculating acoustic time-of-flight (TOF), according to an exemplary embodiment of the subject disclosure.

FIG. 2 depicts an exemplary system 200 for accurately calculating acoustic time-of-flight (TOF), according to an exemplary embodiment of the subject disclosure. System 200 comprises an acoustic monitoring system 202 communicatively coupled to a memory 210 for storing a plurality of processing modules or logical instructions that are executed by processor 205 coupled to computer 201. Acoustic monitoring system 202 may comprise one or more transmitters and one or more receivers. Processing modules within memory 210 may include logical non-transitory computer-readable instructions for enabling processor 205 to perform operations including an acoustic data acquisition module 211 for receiving and processing signals from acoustic monitoring system 202, an error function calculation module 212 for generating an error function of the acoustic data acquired from acoustic data acquisition module 211, a post-processing module 213 for performing error corrections using one or more of an envelope detection, a model frequency sweep correlation, or a clustered multiple linear regression, each of which is described in further detail herein, and an output module 201 for presenting results on a display, performing commands, or otherwise outputting physical, quantitative or graphical results to a user operating computer or sample processing apparatus. Although not shown in FIG. 2, the output module 201 may also be part of a larger computing system include additional user input and output devices such as a keyboard, mouse, stylus, and a display/touchscreen.

A. Acoustic Monitoring System

In an embodiment, an acoustic monitoring system for collecting an acoustic data set is provided, said acoustic monitoring system comprising a transmitter and a receiver, wherein said transmitter and receiver are arranged such that acoustic signals generated by the transmitter are received by the receiver and transformed into a computer-readable signal. In an embodiment, the system comprises an ultrasonic transmitter and an ultrasonic receiver. As used herein, a "transmitter" is a device capable of converting an electrical signal to acoustic energy, and an "ultrasonic transmitter" is a device capable of converting an electrical signal to ultrasonic acoustic energy. As used herein, a "receiver" is a device capable of converting an acoustic wave to an electrical signal, and an "ultrasonic receiver" is a device capable of converting ultrasonic acoustic energy to an electrical signal."

Certain materials useful for generating acoustic energy from electrical signals are also useful for generating electrical signals from acoustic energy. Thus, the transmitter and receiver do not necessarily need to be separate components, although they can be. The transmitter and receiver are arranged such that the receiver detects acoustic waves generated by the transmitter after the transmitted waves have encountered a material of interest. In some embodiments, the receiver is arranged to detect acoustic waves that have been reflected by the material of interest. In other embodiments, the receiver is arranged to detect acoustic waves that have been transmitted through the material of interest.

In an embodiment, the transmitter comprises at least a waveform generator operably linked to a transducer, the waveform generator for generating an electrical signal that is communicated to the transducer, the transducer for converting the electrical signal to an acoustic signal. In certain embodiments, the waveform generator is programmable, such that a user may modify certain parameters of the frequency sweep, including for example: starting and/or ending frequency, the step size between frequencies of the frequency sweep, the number of frequency steps, and/or the duration for which each frequency is transmitted. In other embodiments, the waveform generator is pre-programmed to generate one or more pre-determined frequency sweep patterns. In other embodiments, the waveform generator may be adapted to transmit both pre-programmed frequency sweeps and customized frequency sweeps. The transmitter may also contain a focusing element, which allows the acoustic energy generated by the transducer to be predictably focused and directed to a specific area.

In operation, the transmitter transmits a frequency sweep through the medium, which is then detected by the receiver and transformed into the acoustic data set to be stored in a non-transitory computer readable storage medium and/or transmitted to the signal analyzer for analysis. Where the acoustic data set includes data representative of a phase difference between the transmitted acoustic waves and the received acoustic waves, the acoustic monitoring system may also include a phase comparator, which generates an electrical signal that corresponds to the phase difference between transmitted and received acoustic waves. Thus, in certain embodiments, the acoustic monitoring system comprises a phase comparator communicatively linked to a transmitter and receiver. Where the output of the phase comparator is an analog signal, the acoustic monitoring system may also include an analog to digital converter for converting the analog output of the phase comparator to a digital signal. The digital signal may then be recorded, for example, on a non-transitory computer readable medium, or may be communicated directly to the signal analyzer for analysis.

B. Signal Analyzer

In an embodiment, a system of calculating TOF is provided, said system comprising a signal analyzer containing a processor and a memory coupled to the processor, the memory to store computer-executable instructions that, when executed by the processor, cause the processor to perform operations including one or more of:
(1) an envelope method of TOF calculation;
(2) a curve-fitting method of TOF calculation; and
(3) a linear regression method of TOF calculation;
each as discussed in further detail below.

The term "processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

In operation, the signal analyzer accepts as an input an acoustic data set recorded from a test material. The acoustic data set is representative of at least a portion of a frequency sweep that is detected after the frequency sweep encounters a material of interest. In some embodiments, the portion of the frequency sweep that is detected constitutes acoustic waves that are reflected by the material of interest. In other embodiments, the portion of the frequency sweep that is detected constitutes acoustic waves that have passed through the material of interest. The composition of the acoustic data set that is input into the signal processor depends on the manner in which TOF calculation, each of which is discussed below:

B1. Envelope Method of TOF Calculation

In an envelope method of TOF calculation, TOF is based on an envelope of a minimum of a calculated error function. To calculate the envelope, an error function must first be generated. Error function generation generally requires comparison between: (1) a temporal phase shift generated from a recorded frequency sweep; and (2) a plurality of candidate temporal phase shifts simulated based on a plurality of candidate TOFs. This is repeated for each frequency of the frequency sweep. An error between the observed temporal phase shifts and each of the candidate temporal phase shifts is calculated and plotted as the error function. An envelope function is then applied to the error function. The minimum of the envelope function is selected as the observed TOF.

For example, N temporal phase shifts $\varphi_{exp}$ are determined for a frequency sweep comprising N distinct frequencies, whereby each temporal phase shift is measured upon the transmitter having stabilized at the respective signal frequency. The temporal phase shifts are empirically determined as they are computed, e.g. in the post-processing phase, as a difference of the phase of the transmitted and the received signal. Thus, for each of the scanned frequency values, one respectively measured phase shift $\varphi_{exp}$ is obtained. In addition, the post-processing phase comprises computing, for each of the N frequencies, M candidate phase shifts $\varphi_{cand}$, thereby respectively using one of a plurality of M predefined candidate TOF values as input. The M candidate TOFs may have been taken from the literature, from pre-tests or from any other source of information. Thus, each of the N frequencies corresponds to one measured temporal phase shift $\varphi_{exp}$ and M candidate phase shifts $\varphi_{cand}$.

The observed temporal phase shift is essentially a comparison of the phase of the transmitted and the received acoustic waves at a fixed point in time. In one embodiment, the observed temporal phase shift is generated by simultaneously transmitting and detecting a sinusoidal ultrasonic signal, comparing the phase of the transmitted and detected sinusoidal ultrasonic signal, and generating a signal that correlates with the difference in phase. This can be performed by a phase comparator, which generates an electrical signal that correlates with the phase difference between a transmitted and received acoustic wave.

The candidate temporal phase shift is a mathematical model of the temporal phase shift that would be expected for a given candidate TOF. In one embodiment, a plurality of candidate temporal phase shift values are calculated using a brute force simulation, in which a temporal phase shift is modeled for a plurality of candidate TOFs at each of the frequencies of the frequency sweep. In an embodiment, the candidate temporal phase values are calculated as a function of an input sinusoid frequency. In an exemplary embodiment, the candidate temporal phase shift values are calculated according to formula III:

$$\varphi_{cand}(TOF_{cand}, v) = \left| TOF_{cand} - rnd\left(\frac{TOF_{cand}}{T(v)}\right) T(v) \right|,$$

where $TOF_{cand}$ is a candidate TOF value in nanoseconds, T is the period of the input sinusoid in nanoseconds, rnd represents the round to the nearest integer function, and | . . . | is the absolute value symbol.

Once the candidate temporal phase shifts are generated, an error function is applied to the observed temporal phase shift and the candidate temporal phase shift to calculate an error. As used herein, an "error function" refers to a mathematical comparison between a test data set and a simulated data set. The output of the error function is a mathematical representation of how much the test data set (e.g. the experimentally determined temporal phase shift $\varphi_{exp}$ for a particular frequency) and the simulated data set (e.g. the M candidate phase shifts for said frequency) match. The match between the test data set and the simulated data set increases as the output of the error function approaches zero. Numerous error functions are known. In one exemplary, non-limiting embodiment, the error function is calculated in a least squares sense. In another exemplary, non-limiting embodiment, the error is calculated in a least-squares sense for individual candidate TOF values by Formula II:

$$\text{Error}(TOF_{cand}) = \sum_{v=1}^{N} (\varphi_{cand}(TOF_{cand}, v) - \varphi_{exp}(v)), \quad \text{(II)}$$

where N is the total number of frequencies in the sweep.

An envelope of the error function is then calculated, and the candidate TOF correlating with the minimum of the envelope is selected as the observed TOF. As used herein, an "envelope of an error function" refers to a smooth curve outlining extremes of an error function. In effect, an envelope of the error function involves connecting all of the peaks in the error function by a curve. Said curve may also be referred to as "envelope", "error envelope" or "error envelope curve". Many functions for calculating the envelope are known, including, for example, a Hilbert transform and squaring and lowpass filtering.

For example, the "envelope curve" may be specified by an "envelope function". The envelope curve may outline extremes of an error function in a way that the extreme error values of the function or distribution are smoothed. As used herein, the smoothing of a curve is the mathematical concept of creating a function as an approximating function that attempts to capture important patterns in original curve while leaving out noise or other fine-scale structures/rapid phenomena.

In some embodiments where ringing artifacts (e.g. spurious signals near sharp transitions in a signal) appear, it may be useful to include a downsampling step.

Figure 3:
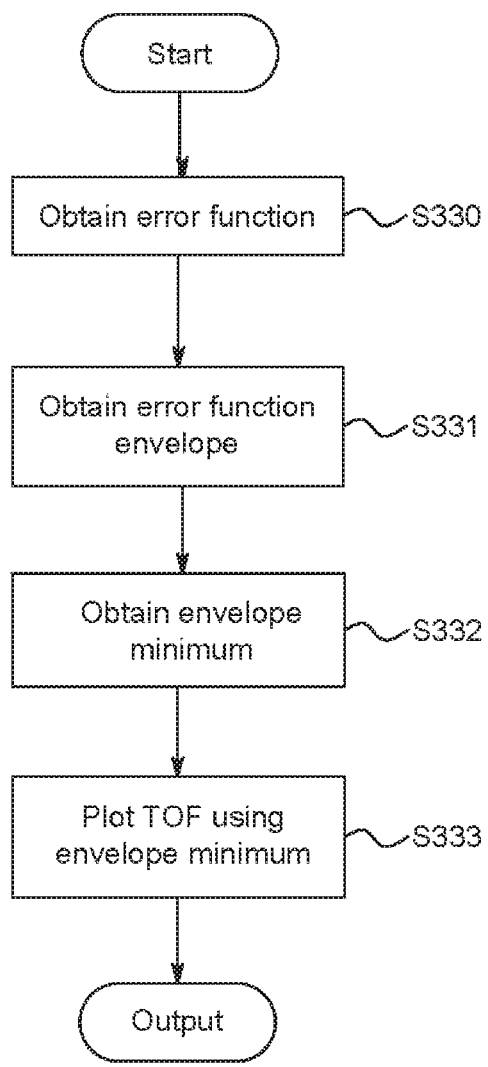
FIG. 3 depicts a method for accurately calculating acoustic TOF using envelope detection, according to an exemplary embodiment of the subject disclosure.
Figure 4A:
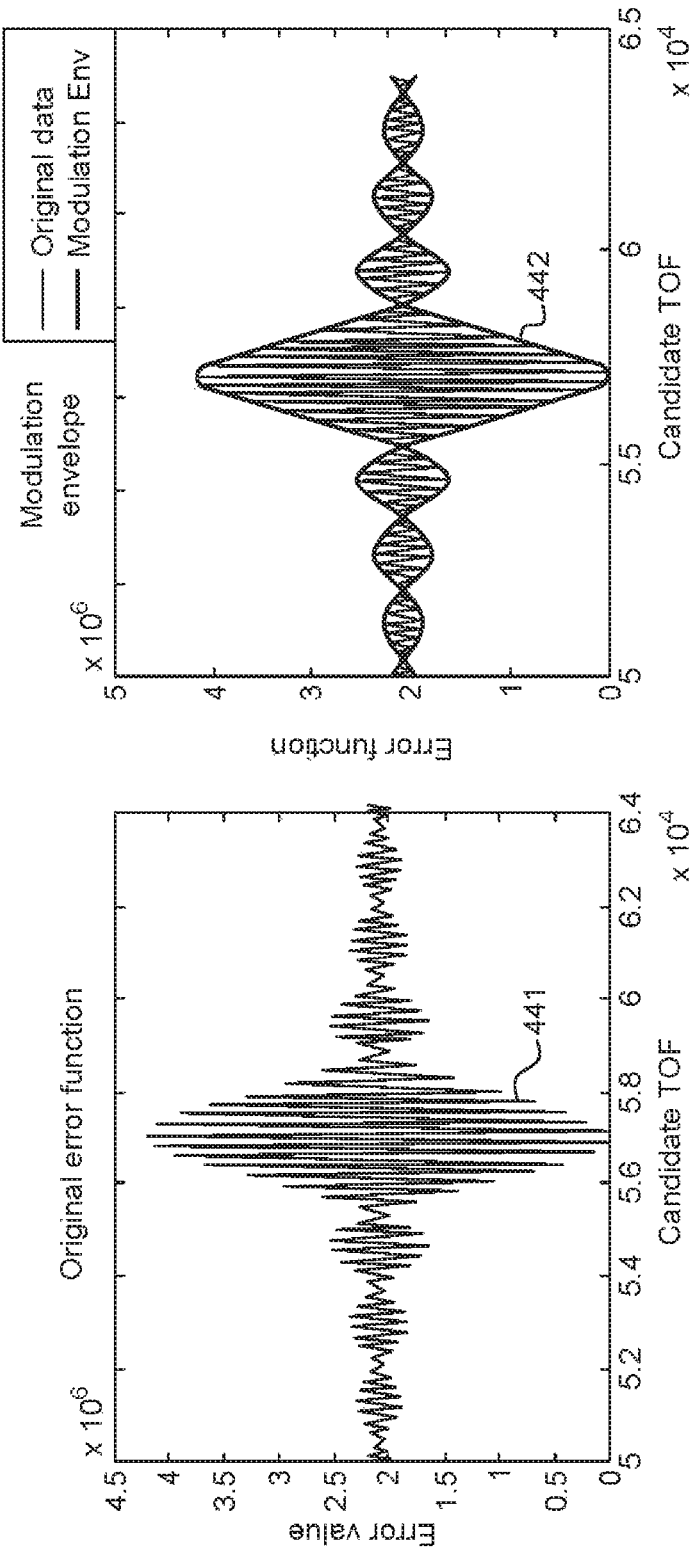
FIGS. 4A-4D show an error function and TOF calculated using an envelope detection method, according to an exemplary embodiment of the subject disclosure.

FIG. 3 depicts an exemplary method for accurately calculating acoustic TOF using envelope detection, according to an exemplary embodiment of the subject disclosure. An error function (S330) is obtained by performing a frequency sweep essentially as described above in section I. An exemplary error function calculated in this manner is shown in FIG. 4A, left side, curve 441. This error function may be similar to the error function depicted in FIG. 1C, which was subject to fluctuations in the local minima, resulting in unreliable TOF values. Referring back to FIG. 3, the error function may be processed and an envelope of the modulation of the error function is obtained (S331) via the Hilbert transform of the error function, followed by downsampling to remove ringing in the function. An exemplary envelope is depicted in FIG. 4A, right side, curve 441.

Figure 4B:
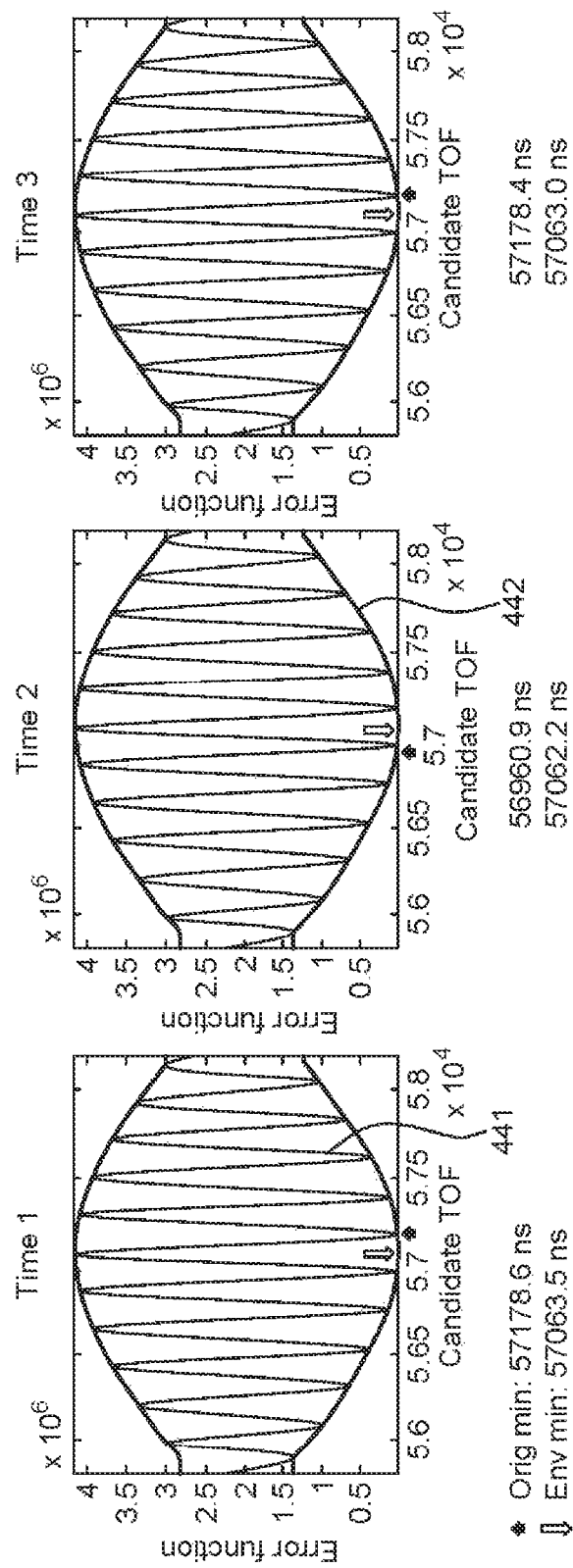
Figure 4C:
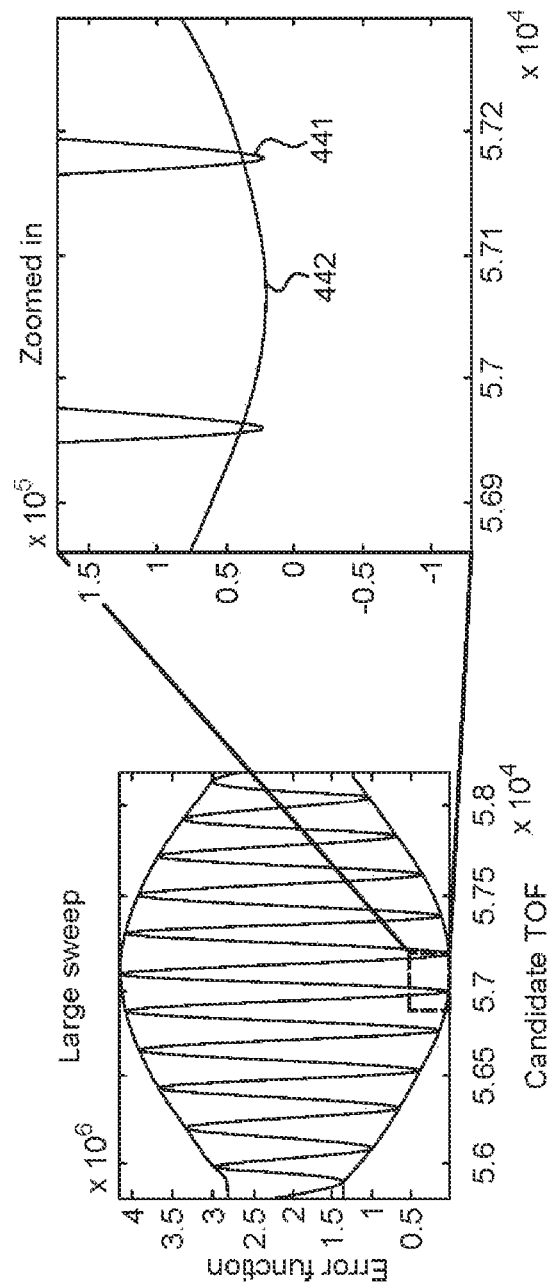

Referring back to FIG. 3, a minimum of the envelope is obtained (S332). FIG. 4B depicts differences between the minima of the error function versus the minima of the envelope. Error function 441 again corresponds to the same three points displayed in FIG. 1C, but includes an envelope 442. This minimum provides a more robust value that is not susceptible to jumping between local minimum. For example, the minimum of the original envelope 441 fluctuates over the three time periods between 57178.6 ns, 56960.9 ns, and 57178.4 ns, resulting in a difference of hundreds of nanoseconds. This may be contrasted with the minimum of the envelope 442, which remains steady over the three times, i.e. only fluctuates between 57063.5 ns, 57062.2 ns, and 57063.0 ns. FIG. 4C shows a zoomed-in depiction of the minimum of the error function envelope 442 versus the adjacent local minima of original error function 441.

The TOF calculation is plotted (S333) using the envelope minima. This stable minimum of the error function envelope results in a more accurate TOF calculation that does not produce spurious signals. See, for example, FIG. 4D.

For example, as depicted in FIG. 4C, the error function may be a function of the deviation of a candidate phase shift $\varphi_{cand}$ computed for a given candidate TOF and a particular frequency from the phase shift $\varphi_{exp}$ having been measured for said frequency. The error function is plotted as depicted in FIGS. 4A-4C and an error envelope curve is plotted on top of said error function. Due to the limited set of candidate TOFs used as input, it may happen that the minimum of the error curve envelope, as depicted in FIG. 4C, is at a position in the envelope 442 that does not correspond to a respective error data point of the original error function 441. Nevertheless, a highly accurate, "true" TOF value can be identified by identifying an envelop-extrapolated candidate TOF value (in FIG. 4C e.g. $5.78 \times 10^4$ ns) for which difference between the respectively extrapolated candidate phase shift $\varphi_{cand}$ and the measured phase shift $\varphi_{exp}$ is minimal.

Figure 4D:
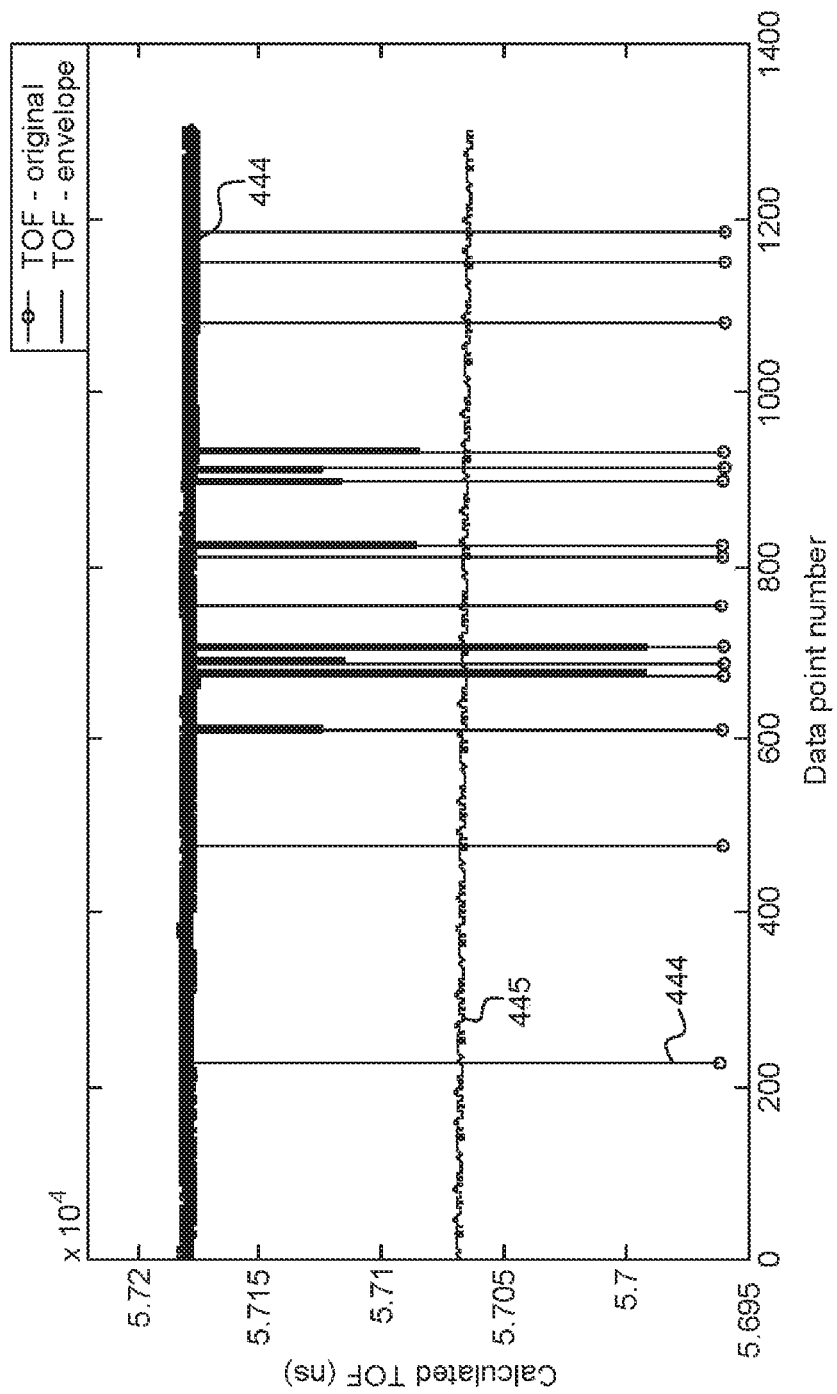

FIG. 4D shows the TOF 444 calculated with original error function and TOF 445 based on the envelope, as determined for 1300 data points. Evidently, the TOF 445 is considerably more stable with envelope algorithm versus TOF 444 based simply on the original envelope. The increased precision of the time-of-flight provides a more reliable result for different tissues having different characteristics, as tissue types vary and a single TOF result is generally difficult to quantify. Moreover, this embodiment is based on an experimental result using only water, and shows how the stabilization is improved. These methods may be applied to any other system, or to calibrate existing systems.

B2. Curve Fitting Method of TOF Calculation

The "curve fitting method" of calculating TOF exploits the linearity of the accumulated phase comparison through a frequency sweep. The TOF between two ultrasound transducers can be calculated by the slope of a phase-frequency curve obtained for the frequency sweep. However, as a full cycle is accumulated the phase returns to 0 so the phase versus ultrasound frequency looks like a triangle wave. This algorithm produces a candidate triangle wave with a given amplitude, frequency and phase. The candidate triangle wave's amplitude, frequency and phase are varied and compared against the experimentally detected triangle from the frequency sweep. The closest match between candidate and experimental waves is then used to directly calculate the observed TOF using the known relationship between a triangle wave's frequency and the absolute value of its slope. The slope is then used to calculate TOF.

Figure 5:
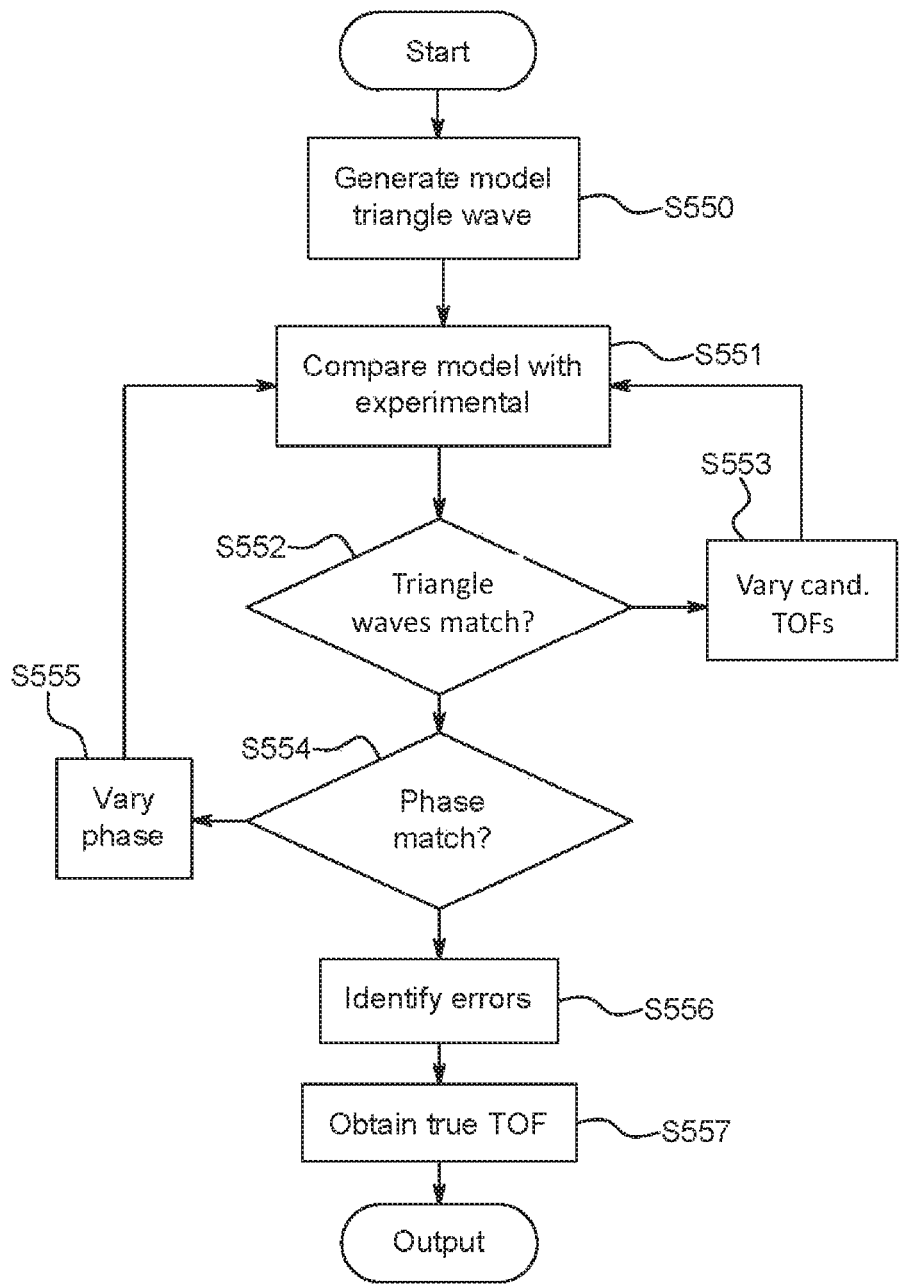
FIG. 5 depicts a method for accurately calculating acoustic TOF using modeled frequency sweep correlation, according to an exemplary embodiment of the subject disclosure.

FIG. 5 depicts a method for accurately calculating acoustic TOF using modeled frequency sweep correlation, according to an exemplary embodiment of the subject disclosure.

Figure 6A:
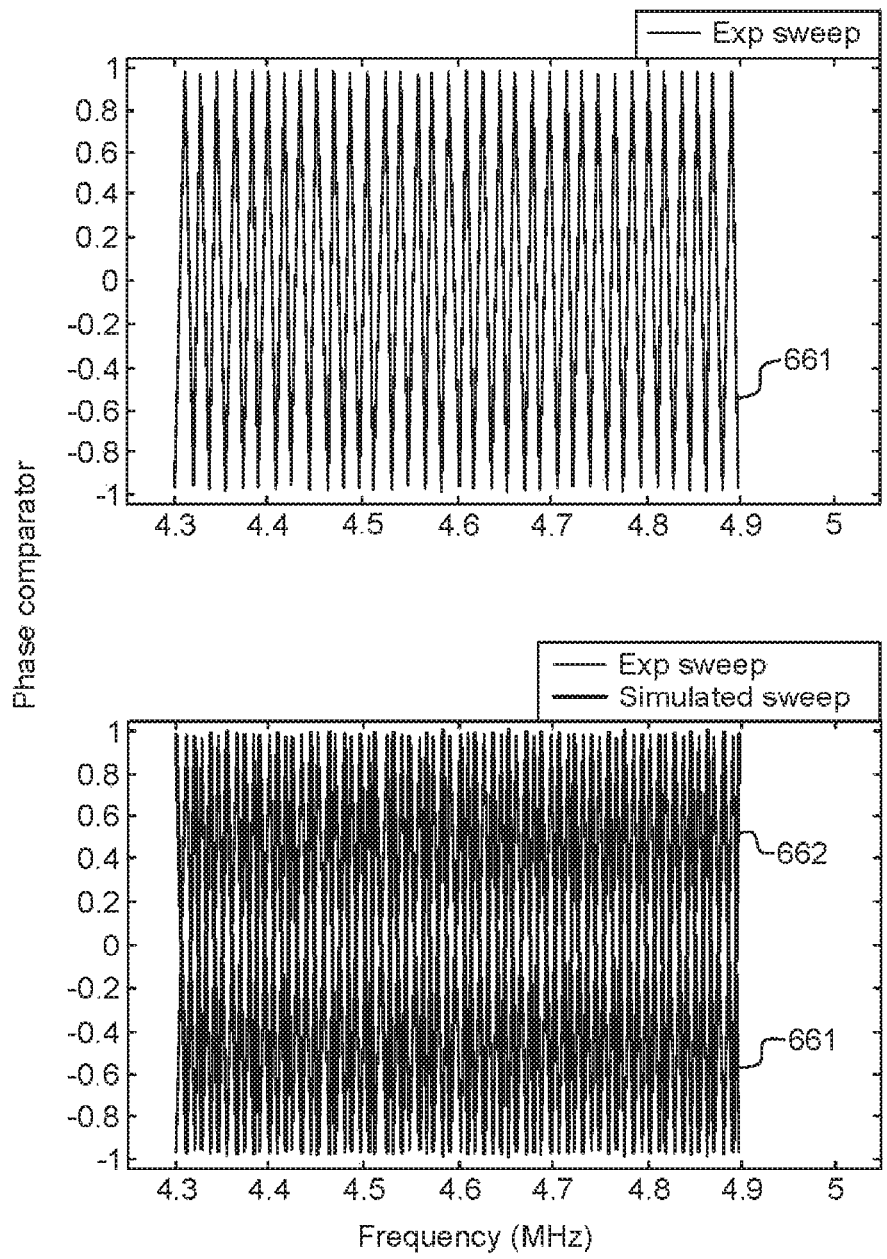
FIGS. 6A-6D show an error function and TOF calculated using an envelope detection method, according to an exemplary embodiment of the subject disclosure.

In this embodiment, the method exploits the linearity of the accumulated phase comparison through a frequency sweep determined by acoustic spectroscopy. The method include generating a "measured", "experimental" or "modeled" triangle wave (S550) for a frequency sweep measured between two ultrasound transducers, comparing the experimental triangle wave with a candidate triangle wave of the frequency sweep (S551) and looping the triangle wave's frequency and phase continuously until a match is found (loop S551-S555). An exemplary frequency sweep, experimental triangle wave and candidate triangle wave are depicted in FIG. 6A. Generally, a TOF may be calculated by a slope of the frequency sweep. However, as a full cycle is accumulated the phase returns to 0 so the phase versus ultrasound frequency looks like a triangle wave, as depicted by the top half (element 661) of FIG. 6A. The described method therefore produces a "candidate" triangle wave 662 with a given amplitude, frequency and phase, as depicted by the bottom half of FIG. 6A, which shows the candidate wave 662 superimposed over the original or experimental frequency sweep 661.

According to embodiments, each triangle wave is plotted with frequency on the x-axis and the phase shift obtained for each frequency of the frequency sweep plotted on the y-axis. The slope of said wave thus may indicate the change in phase shifts versus acoustic frequency.

Candidate triangle wave 662 has an amplitude, phase offset, and frequency. The amplitude is matched or normalized to the amplitude of the experimental wave 661, and all phase offsets and candidate TOFs are looped through to numerically determine which phase and frequency match best with the experimental signal 661. Referring back to FIG. 5, a comparison step (S551) enables a determination of an error between the candidate triangle waves and the experimental triangle wave. The comparison step (S551) may include generating an error function comprising the point-by-point squared sum difference of the experimental triangle wave and the candidate triangle wave. The comparison loop includes comparing the frequency of the candidate wave with the experimental triangle wave (S552), and varying the candidate TOF (S553) until a match is found. In some embodiments, a plurality of candidate TOFs may be varied (S553) until a match is found. In other embodiments, all candidate triangle waves may be compared with the experimental triangle wave (S551) and a resulting error function being used to determine the true TOF (S557). Further, a plurality of candidate phases are also varied (S555) to determine a match (S554). As in the case of the candidate frequencies, the phase may be varied until a match is found, or a plurality of phases may be used to compare the modeled triangle wave (S550) with the experimental data and an error function generated based on the results.

Figure 6B:
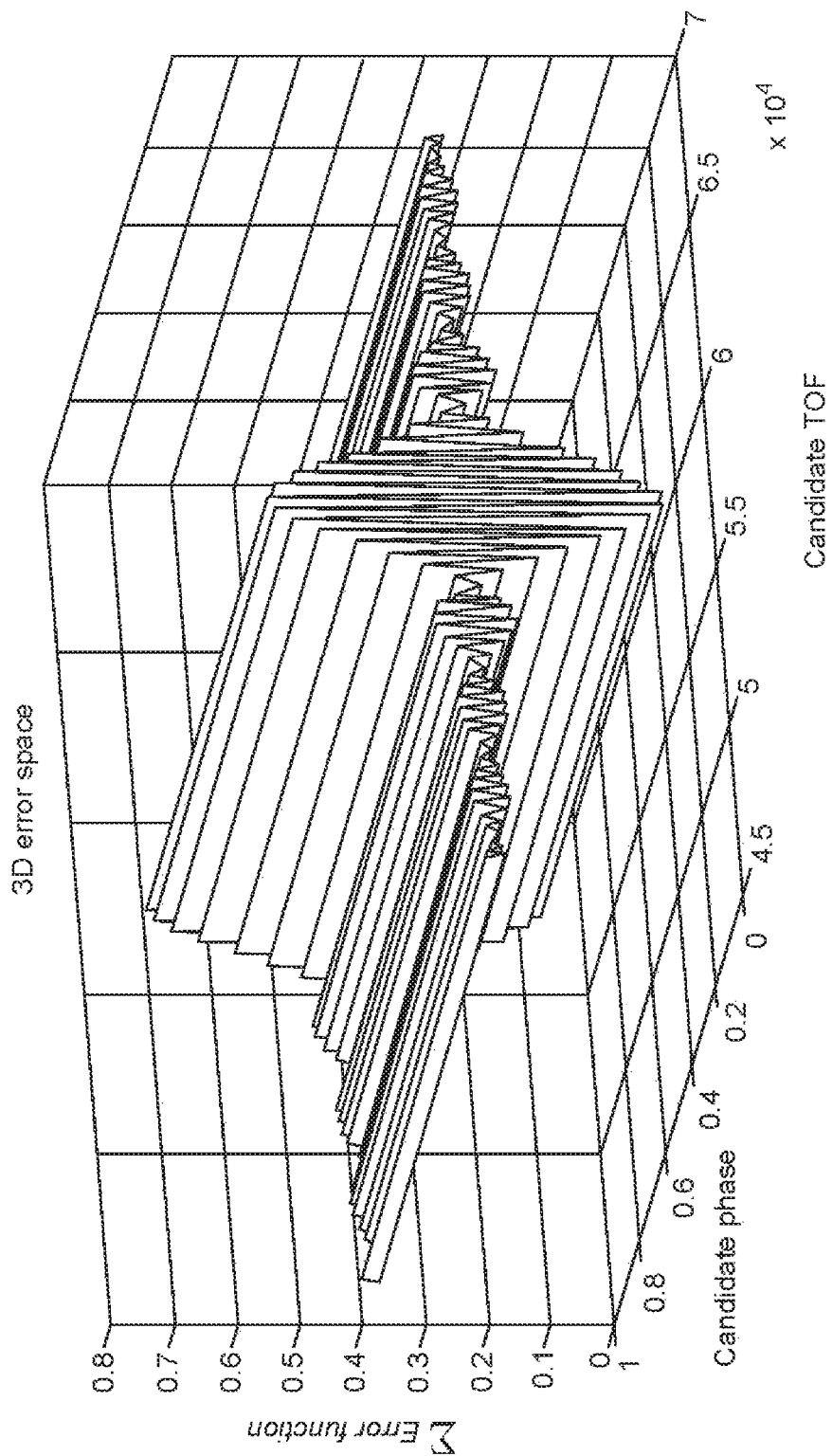
Figure 6C:
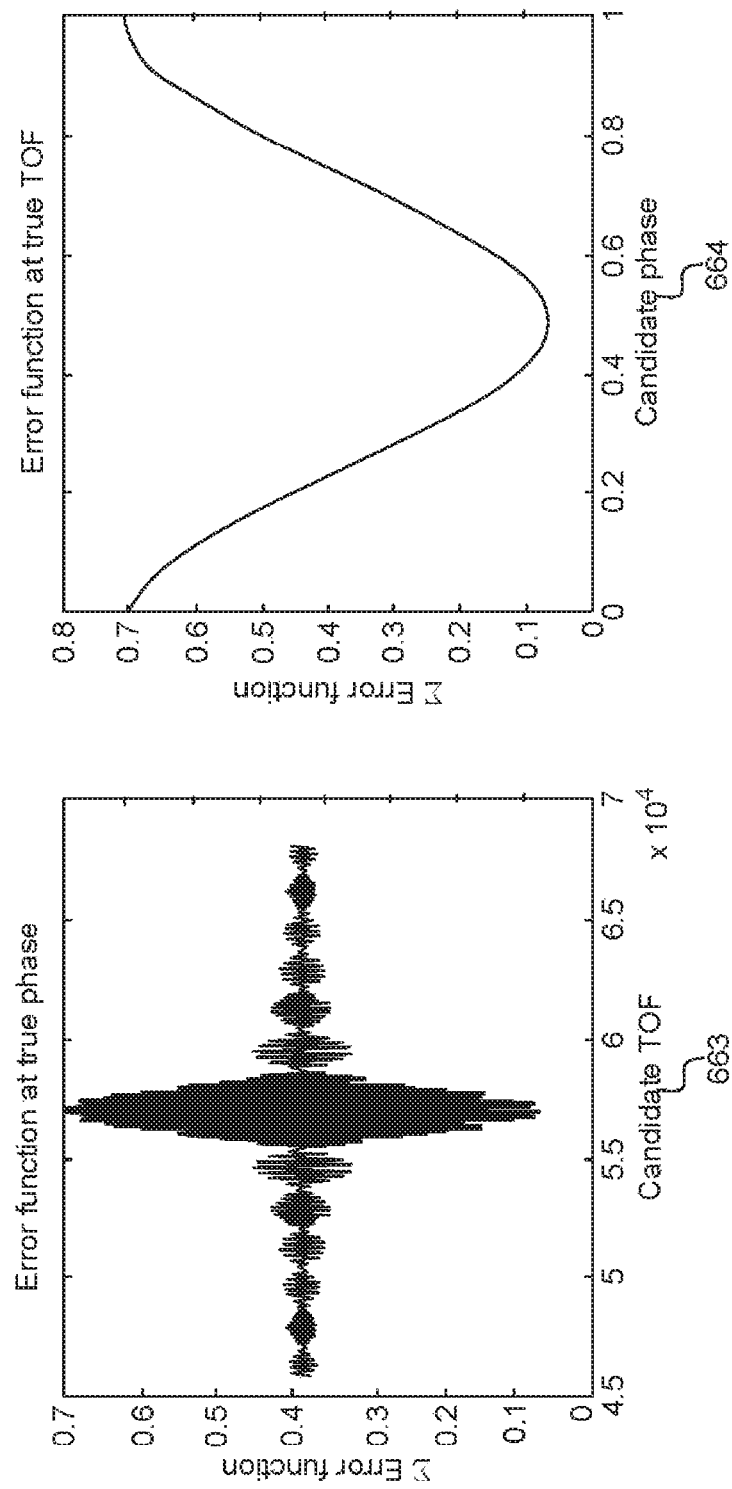

For example, FIG. 6B shows a three-dimensional plot of the error function versus candidate phase and candidate TOF of the simulated or modeled triangle wave. The frequency at the global minimum is used to calculate the TOF. The 3D error function may be reduced in dimensionality and plotted as shown in FIG. 6C, depicting a two-dimensional error function as a function of the candidate TOF (663) at the ideal candidate phase, and a two-dimensional error function as a function of candidate phase (664) at the ideal candidate TOF.

Referring back to FIG. 5, errors may be identified (S556) based on the error function. For example, if the phase frequency sweep has an artificial offset or phase shift, step S556 identifies these offsets as a potential source of error. The closest match between candidate and experimental waves is then used to directly calculate the true TOF (S557)

using the known relationship between a triangle wave's frequency and the absolute value of its slope. In other words, the slope of the best-fitting is used to calculate the TOF.

According to embodiments, for a plurality of N frequencies of a frequency sweep, a respective set of N phase shifts $\varphi_{exp}$ is experimentally determined as described beforehand.

Next, for the whole frequency sweep, a triangle curve is created that is in the following referred to as "measured triangle wave" or "measured triangle curve". The measured triangle wave is created by plotting the N frequencies of the frequency sweep on the x-axis and plotting the phase shift signal output by the phase comparator on the y-axis, whereby the phase shift signal is centered around a zero-phase-shift value base line of the x-axis (see e.g. upper plot of FIG. 6a as an example). The plotted data points are connected by a curve which has a triangle form. A "triangle wave" or "triangle curve" as used herein is a non-sinusoidal waveform named for its triangular shape. It is a periodic, piecewise linear, continuous real function.

Then, a processor of the signal analyzer may enter a loop over M predefined candidate TOFs (or less in case a match was found before the totality of M candidate TOFs were analyzied). In each step of said loop over the M candidate TOFs, a candidate phase is computed, for each of the N frequencies of the frequency sweep and for the particular one candidate TOF selected in said loop step, according to:

$$\varphi_{cand}(TOF_{cand}, v) = \left|TOF_{cand} - rnd\left(\frac{TOF_{cand}}{T(v)}\right)T(v)\right|.$$

Thus, for each of the N frequency values a respective candidate phase was computed for the currently selected candidate TOF. Said candidate phase values are plotted over the series of N frequencies for creating a "candidate triangle curve" or "candidate triangle wave" analoguos to the measured triangle wave. In each loop for a current candidate TOF, a respective candidate triangle wave is created by plotting the N frequencies of the frequency sweep on the x-axis and plotting the candidate phase shift signals computed for the N different frequencies on the y-axis, whereby the candidate phase shift signal is also centered around a zero-phase-shift value base line of the x-axis. The candidate triangle wave can be plotted as an overlay in the plot comprising already the measured triangle curve (see e.g. lower plot of FIG. 6a) or can be plotted separately. The plotted data points of the candidate phase shifts are connected by a line for creating the "candidate triangle wave" of the current candidate TOF. Said candidate triangle wave is aligned with and compared with the measured triangle wave. An error function is used for computing the difference between the measured triangle wave and the candidate triangle wave (e.g. as the area defined by aligned linear sections of the two compared triangle waves or any other similarity measure for two triangle waves aligned to the same basis (amplitude equals "0"). As long as the error measure decreases, the looping is continued, whereby in each new loop step a new one of the candidate TOFs is selected as the current candidate TOF of the loop and a new respective candidate triangle wave is computed. The method may terminate in case the "error" or "distance" between the measured triangle wave and the current candidate triangle wave equals zero or in case the error, after having declined for some loop iterations, starts to raise again.

According to other embodiments, a candidate triangle wave is computed for each of the M candidate TOFs and the candidate triangle wave (and its corresponding candidate TOF) being identical to or having minimum difference with the measured triangle wave is identified in a subsequent processing step.

Thus, for a frequency sweep comprising N different frequencies and for M predefined candidate TOFs, a single measured triangle wave and up to M candidate triangle waves are generated and plotted and used for identifying the candidate TOF of the one of the (up to) M candidate triangle wave that is most similar to (has the minimum error in respect to) the measured triangle wave. Said identified candidate TOF may be used as the "true" TOF identified with high accuracy according to embodiments of the invention.

According to embodiments, the amplitudes of the measured triangle wave as well as the amplitudes of each of the candidate triangle waves are normalized to a predefined maximum amplitude value, e.g. "1". The normalization of the amplitudes of the measured and the candidate triangle wave in respect to a single reference value may ease later comparison of the measured with the candidate triangle waves.

After having generated and plotted the measured triangle wave and the M candidate triangle waves and after an optional normalization step, for each of the candidate triangle waves the difference ("error") between said candidate triangle wave and the measured triangle wave is calculated.

According to embodiments, the "true TOF identification" may further be refined by adding "artificial offsets", also referred to as "candidate offsets", to the computational model used for computing the candidate triangle waves. For example, the processor of the signal analyzer may enter a loop over R predefined candidate offsets for the candidate triangle waves. For example, there may be 360 different candidate offsets, each candidate offset corresponding to a phase shift of $$\frac{\lambda}{360}.$$

In each step of said loop over the R artificial offsets, a candidate phase is computed for each of the N frequencies of the frequency sweep, for a current candidate TOF selected in a candidate TOF-loop step and for a the current artificial offset according to:

$$\varphi_{cand}(TOF_{cand}, v, OF_{cand}) = \varphi_{cand}(TOF_{cand}, v) + OF_{cand}.$$

Thus, for each of the N frequency values a respective candidate phase was computed for the currently selected candidate TOF and the currently selected candidate artificial offset. Said candidate phase values are plotted over the series of N frequencies for creating a "candidate triangle wave" as described already in the preceding paragraphs. In each loop for a current candidate artificial offset, a respective candidate triangle wave is created by plotting the N frequencies of the frequency sweep on the x-axis and plotting the candidate phase shift signals computed for the N different frequencies on the y-axis, whereby the candidate phase shift signal is also centered around a zero-phase-shift value base line of the x-axis. The candidate triangle wave can be plotted as an overlay in the plot comprising already the measured triangle curve (see e.g. lower plot of FIG. 6a) or can be plotted separately.

So for M candidate TOFS and R candidate artificial offsets, up to M×O candidate triangle waves may be generated that are compared with the one measured triangle wave for identifying the one of the candidate triangle waves being identical to or the most similar to the measured triangle wave. The identification may be performed in a loop as described already for the candidate TOF loop or may be performed after a totality of M×R candidate triangle plots were computed. As for the candidate TOF loop, the identification of the candidate triangle wave being the most similar to the measured triangle wave may comprise numerically determining which candidate phase (depending on the candidate TOF and candidate artificial offset) match best with the measured or experimental triangle wave (e.g. the wave 661). The candidate TOF and candidate artificial offset that were used to compute said identified ("most similar") candidate triangle wave is identified as the "real" or "true" TOF.

For example, in case the number M of candidate TOFs is 25.000 and the number R of candidate artificial offsets is 360, there may be 25.000×360=900.000 candidate triangle waves that are compared with the measured triangle wave.

Comparing triangle waves and computing the error for the triangle waves may have the advantage that by comparing triangle waves rather than individual measurement points, a high accuracy of error computation is achieved. Moreover, due to the larger amount of data processed for computing the error, it may be possible to perform the frequency scanning and curve computation or measurement only for a subset of the N frequencies supported by the transmitting and sending transducer pair. Considering artificial offsets (which simulate a "real" phase offset that might have occurred when determining the characteristics of the transmitted signal may further increase the accuracy of the TOF determination, because any erroneous effect that may have resulted in an unwanted phase offset when performing the "real", empirical phase shift determination is compensated by considering also the artificial offsets when computing the candidate triangle waves.

The comparison of the measured triangle wave with each of the candidate triangle waves may include generating an error function comprising the point-by-point squared sum difference of the measured triangle wave and the candidate triangle wave. For example, FIG. 6B shows a three-dimensional plot of the error function versus candidate phase and candidate TOF of a respective candidate (i.e.: simulated or modeled) triangle wave. The frequency at the global minimum is used to identify the "best matching candidate triangle wave" and its respective candidate TOF and candidate artificial offset. The 3D error function may be reduced in dimensionality and plotted as shown in FIG. 6C, depicting a two-dimensional error function as a function of the candidate TOF (663) at the ideal candidate phase (including the ideal artificial phase offset), and a two-dimensional error function as a function of candidate phases (depending on respective candidate artificial offsets) (664) at the ideal candidate TOF.

Figure 6D:
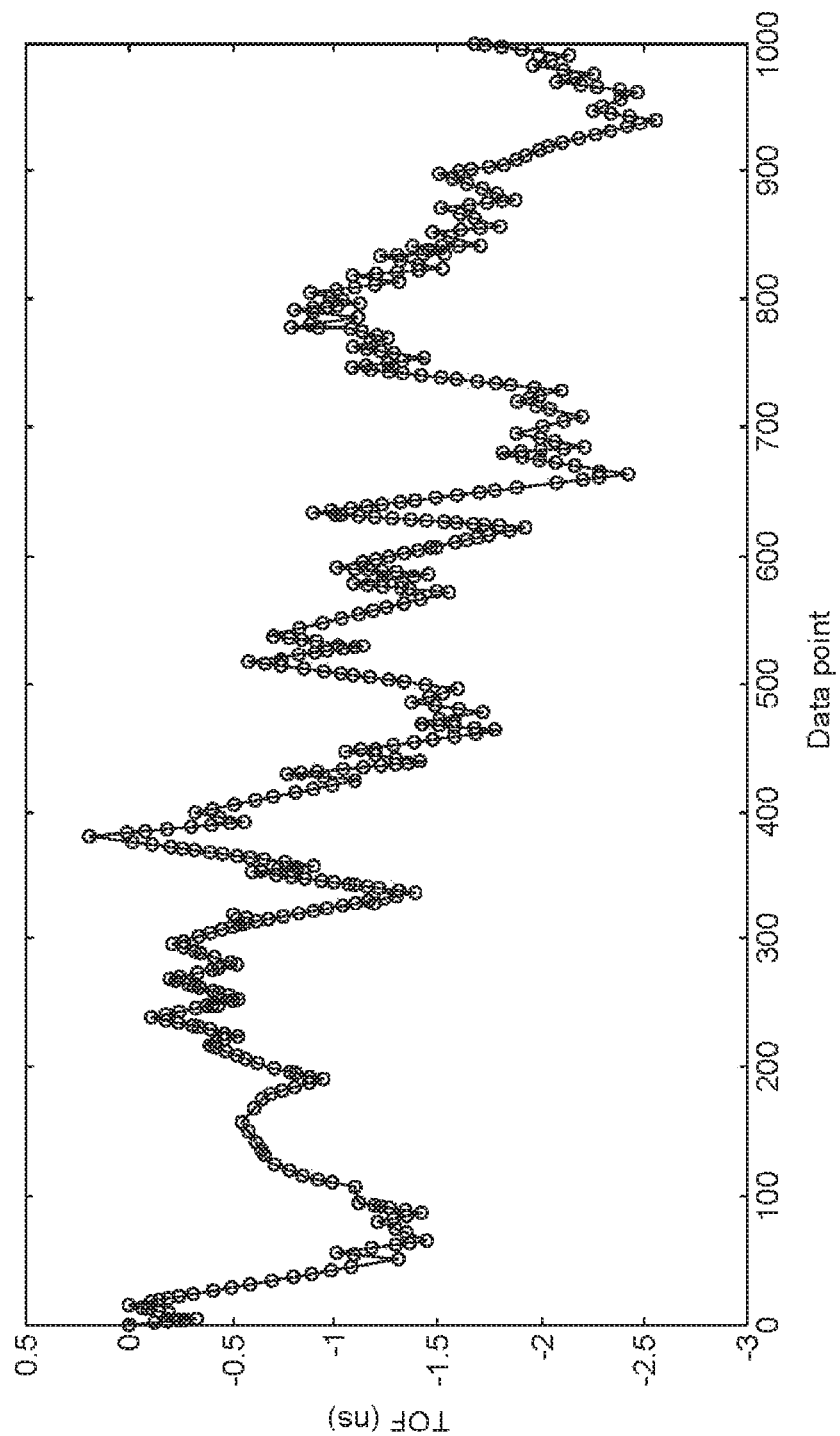

FIG. 6D shows the TOF calculated using the modeled frequency sweep algorithm for 1000 TOF data points. The signal is very stable as the large discontinuities have been removed, and further demonstrates a low standard deviation ($\sigma \approx 0.5$ ns). This method produced a very stable TOF signal that varied only 2 ns after acquiring data for over an hour.

According to embodiments, the envelope method described in B1 can be combined with the approach disclosed in B2. For example, the distance of the candidate triangle waves and the measured triangle wave can be modeled by a distance function or "error function". Instead of computing the error for each individual pair of compared candidate and measured triangle wave, the error function may be descriptive of a TOF value and/or an artificial offset value corresponding to a global minimum of the distance (or "error") relative to the measured triangle function. The TOF value and the offset value at said particular global minimum may or may not be contained in the predefined sets of candidate TOFs and candidate offsets. However, the global minimum of the envelope function may be used for extrapolating to an "extrapolated" candidate TOF and/or "extrapolated" phase shift whose corresponding extrapolated candidate triangle wave matches the measured triangle wave even more than a combination of the best matching candidate TOF and candidate offset value. In said embodiments, the minimum of the error function corresponding to a particular TOF that can be extrapolated from the envelope function is used instead of one of the candidate TOFs as the "true" TOF.

B3. Linear Regression Method of Calculating TOF

Figure 7:
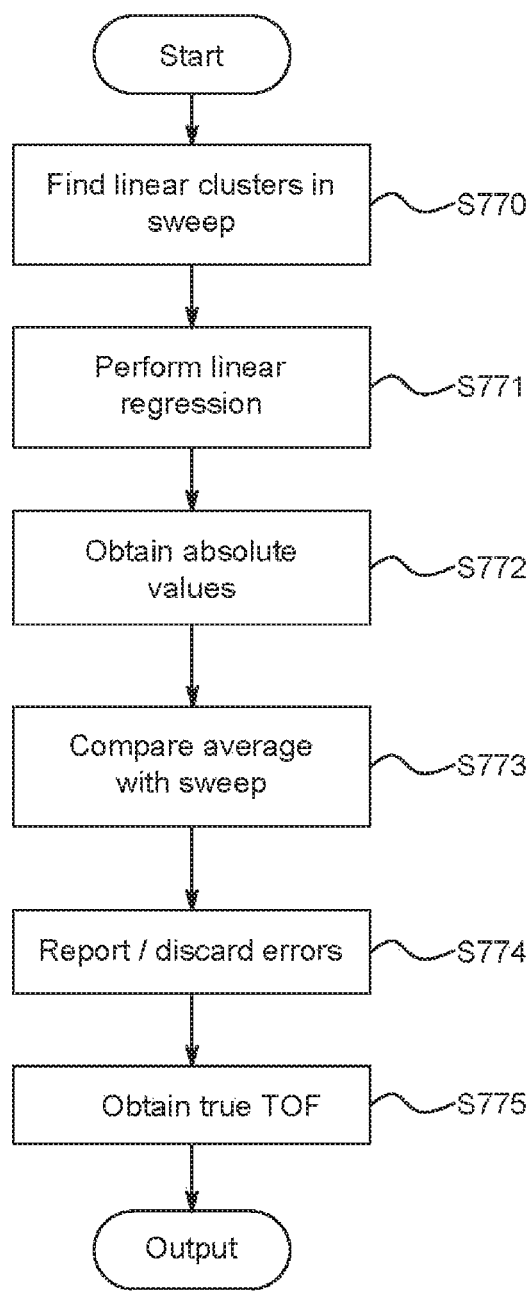
FIG. 7 depicts a method for accurately calculating acoustic TOF using clustered multiple linear regression, according to an exemplary embodiment of the subject disclosure.

FIG. 7 depicts a method for accurately calculating acoustic TOF using clustered multiple linear regression, according to an exemplary embodiment of the subject disclosure. This method calculates the TOF signal in a more robust manner by seeking out the individual linear sections of an ultrasound frequency sweep, performing a linear regression to each region, and averaging the slopes of each region to determine the true TOF. This may be contrasted with the previous embodiment in which the ideal phase of the frequency sweep was determined to find the ideal frequency, with the slope of that frequency being reconstructed and equated to the TOF, whereas in this embodiment, the slopes of the phase frequency sweep are directly computed.

Figure 8A:
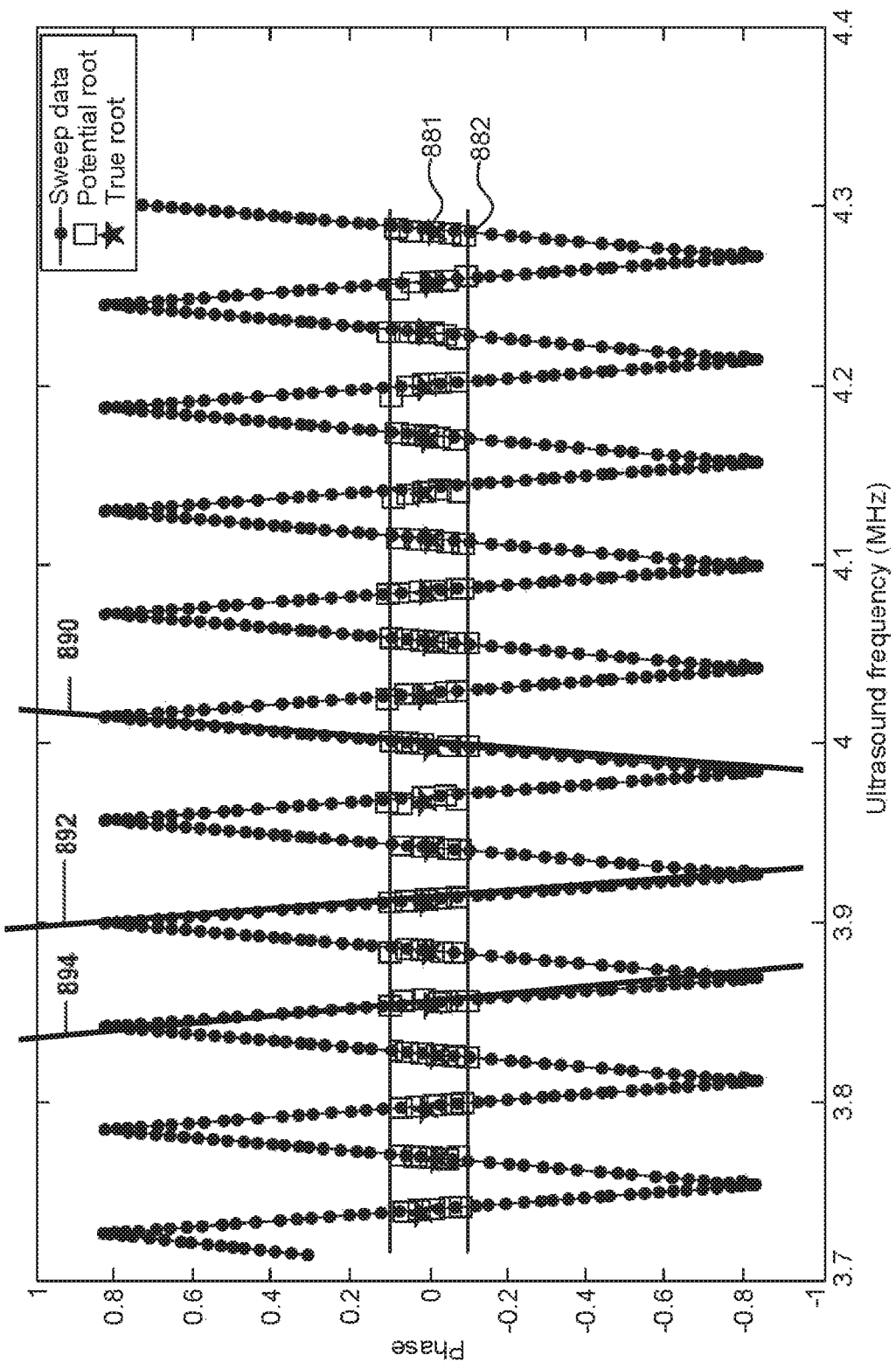
FIGS. 8A-8E show an error function and TOF calculated using an envelope detection method, according to an exemplary embodiment of the subject disclosure.
Figure 8B:
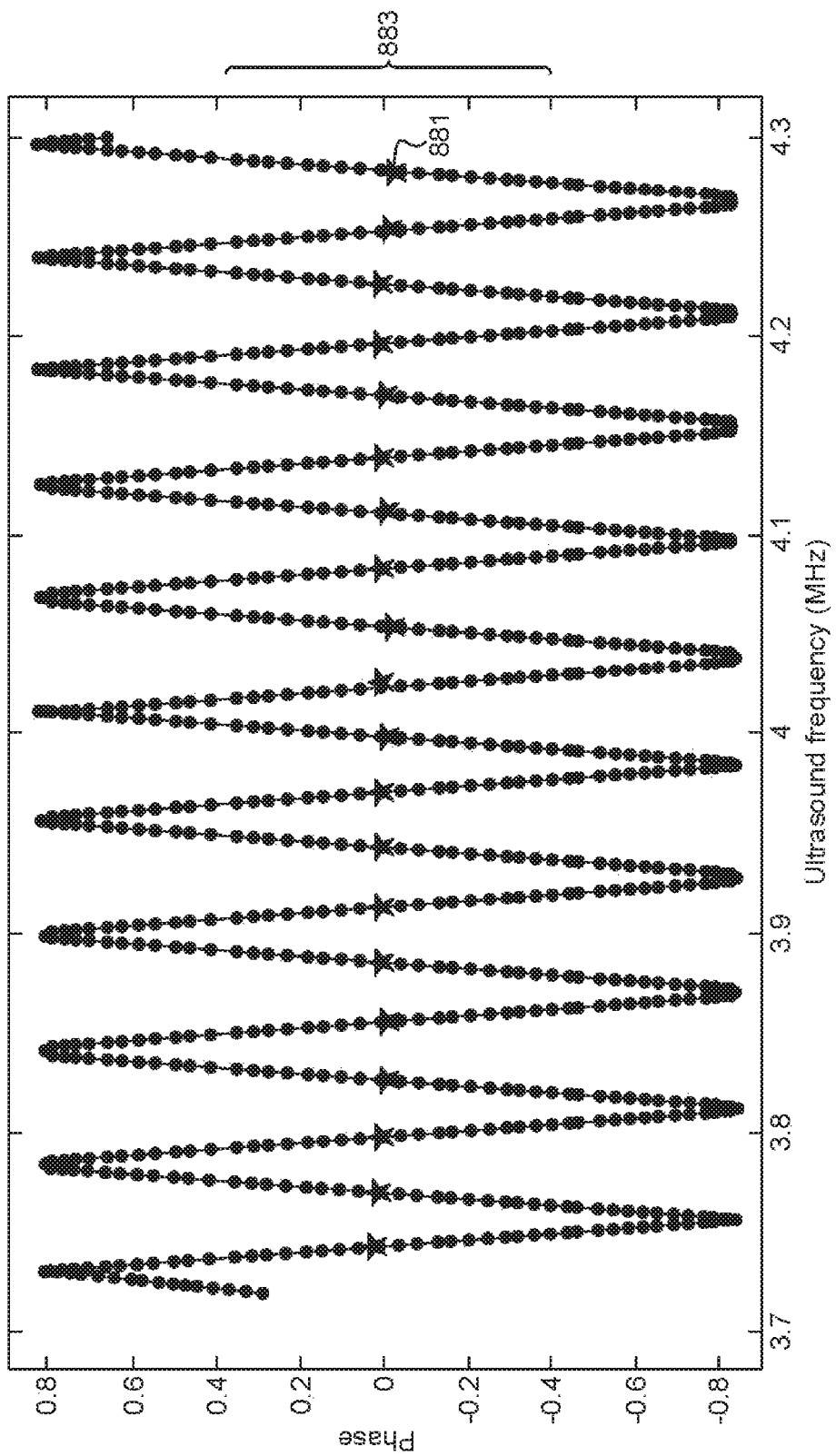
Figure 8C:
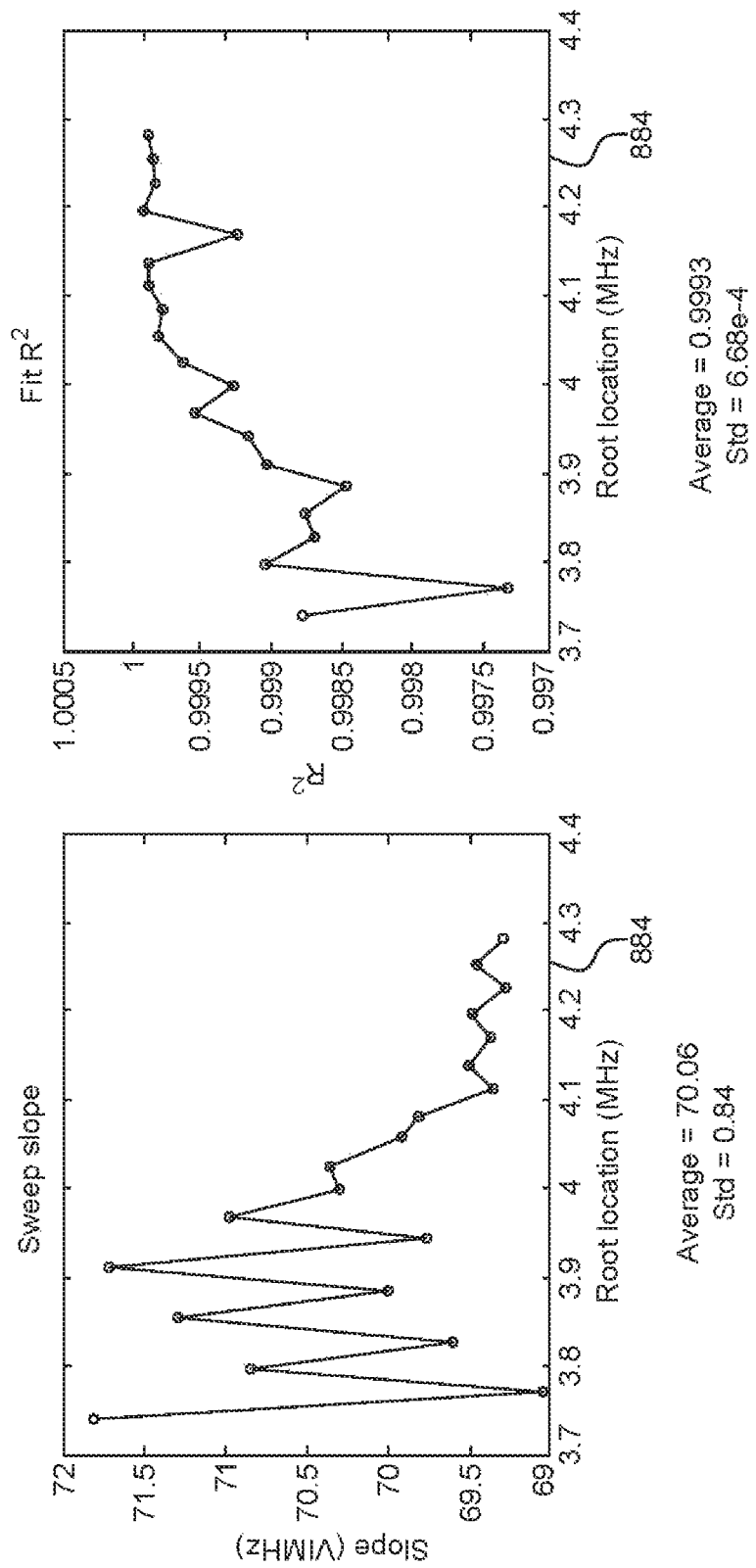

The method begins with an operation to determine the linear clusters in a frequency sweep. As described herein, the frequency sweep may appear as a triangle wave. Therefore, any linear clusters may be determined by finding potential roots or data points that represent a center of a line of the triangle wave. The frequency sweep data may be centered on a y-axis at a point such as y=0. For example, FIG. 8A shows an ultrasound frequency sweep with potential roots 882 and true roots 881 for each linear cluster identified. The potential roots may be clustered into a discrete group, and the true root represents the center of the cluster. Referring back to FIG. 7, a linear regression is performed about each true root (S771). FIG. 8B shows the ultrasound frequency sweep with a linear regression calculated for each linear cluster 883, and centered on the respective cluster's true root 881. Referring back to FIG. 7, an absolute value of each linear regression is obtained (S772), and the data points of the absolute values are compared with an average (S773) to determine errors (S774) and obtain the true TOF (S775). For example, FIG. 8C shows the slope from each cluster 883 on the left graph 884, and coefficient of regression or $R^2$ values 885 for each cluster. The low standard deviation of slope graph 884 indicates a successful frequency sweep, and a strong $R^2$ value provides a confidence measure for each slope value, and therefore also indicates a successful frequency sweep.

Figure 8D:
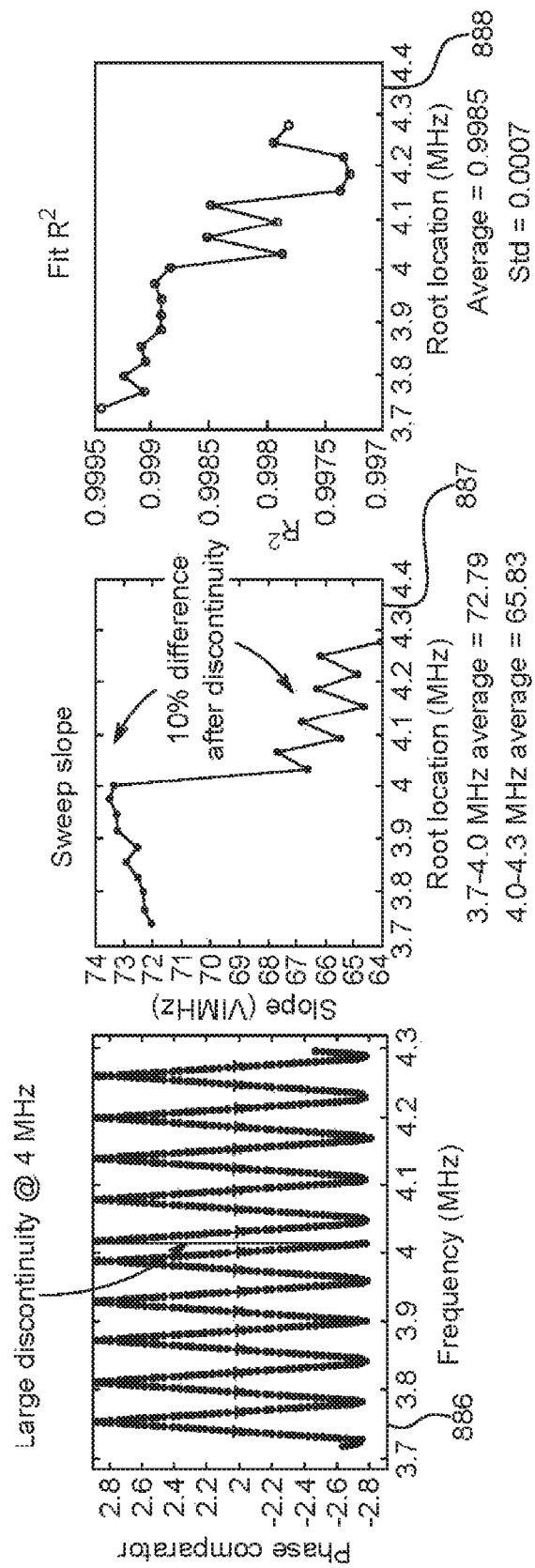
Figure 8E:
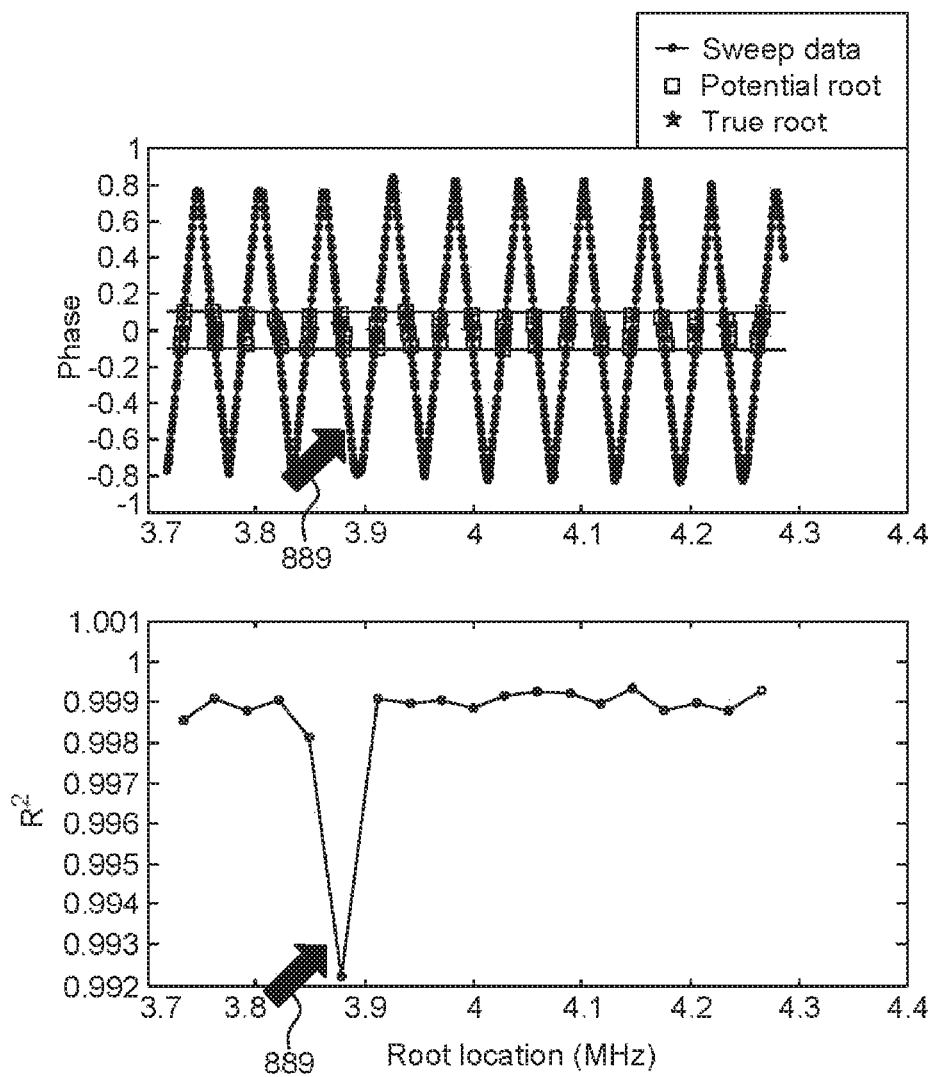

As described above, errors may be identified in measured frequency sweeps. For example, low signal-to-noise values (bad data points) for individual linear section can be identified so that data can be thrown out to improve the integrity of the TOF calculation. Furthermore, large discontinuities have been observed in the frequency sweep data possibly from physical disturbances in the fluid during the frequency sweep or electronic errors in the output of the phase comparator. For example, a tissue sample may have moved or the signal had an error that affected the measurement. The exemplary method of finding individual slopes per phase cycle is advantageous because discrete frequency sweep values that are erroneous and that will thus introduce error into the TOF calculation can be found and eliminated or reported. For example, FIG. 8D shows a frequency sweep 886 that has a large discontinuity near 4 MHz. In FIG. 8D, a sweep slope 887 from each linear region depicts a large (10%) change in slope, correctly identifying the discontinuity in the individual slopes values. $R^2$ values 888 at each linear region further depict this jump. In this embodiment, the TOF calculation is rendered impossible due to the numerous outlying values and, therefore, an output may include a recommendation to perform the sweep again. FIG. 8E shows a frequency sweep on its top half with several erroneous points on one of the down slopes, and $R^2$ values on its bottom half for each cluster of the sweep with erroneous points clearly identified by their poor correlation as depicted by arrows 889. In contrast to FIG. 8D, the outlying values here may be discarded prior to a true TOF measurement, versus the embodiment in FIG. 8D where most of the data was erroneous.

Therefore, this method can be used to identify those situations so the data can be identified as incorrect and removed from the TOF calculation. For instance, any slopes that do not appear linear may be discarded. Additionally, quality assurance is provided by recommending a re-acquisition of the frequency sweep after a large discontinuity.

According to embodiments, the approach of b3 starts (like approach b2) by experimentally determining, for a plurality of N frequencies of a frequency sweep (ranging e.g. from 3.7 to 4.3 MHz), a respective set of N phase shifts $\varphi_{exp}$ is experimentally determined.

Next, for the whole frequency sweep, a triangle wave is created that is in the following referred to as "measured triangle wave" or "measured triangle wave". The measured triangle wave is created by plotting the N frequencies of the frequency sweep on one (e.g. the x) axis and plotting the phase shift signal $\varphi_{exp}$ provided by the phase comparator on another (e.g. y) axis. According to embodiments, the phase shift signal is centered around a zero-phase-shift value (represented e.g. by the x-axis acting as base-line—see e.g. "Phase=0" in FIG. 8a). For example, the centering may be performed by identifying the mean of the minimum and the maximum measured phase over the whole examined frequency range. Alternatively, the mean of all phase values of all data points may be identified and used as the "zero" base line for centering the curve. The plotted data points are connected by a curve which has a triangle form.

Next, a plurality of linear regions in the measured triangle wave is identified, whereby all data points of said curve belonging to said linear regions are considered as clusters (i.e., sets) of data points belonging to the same linear region. A "linear region" of the measured triangle wave is a curve section with a constant (or approximately constant) slope. For example, FIG. 8A shows 20 (full) linear regions, three of which being identified by respective straight lines 890, 892, 894. All data points lying on or in spatial proximity (e.g. within a distance threshold) from a line 890, 892, 894 are identified as members of a data point cluster corresponding to the linear region identified by said straight line. Thus, each cluster corresponds to the individual slope of a respective half of a phase cycle of the measured triangle wave.

Next, a set of candidate roots is identified in each cluster, whereby a candidate root is a data value whose distance to the "0" phase shift value (measured as absolute value) is smaller than a maximum phase shift difference threshold. In FIG. 8A, all candidate roots are surrounded by a square border.

Next, for each of the clusters, the one of the candidate roots is identified having the minimum distance to the "0" phase shift value. Said identified candidate root is used as "true root" of the cluster of data points. The "true root" data point of each cluster is indicated in FIG. 8A with a star symbol. According to some embodiments, the "true roots" of each cluster is identified directly, i.e., without determining candidate roots, by identifying the one of the data points of the duster having the minimum distance to the "0" phase shift value.

Next, for each of the clusters, a linear regression step is performed selectively on the data points of said cluster for computing a computed slope $$\left(\frac{\partial \text{phase } shif}{\partial US - \text{frequency}}\right).$$

As the data points are measurement values, the computed slopes derived via the cluster-based linear regression might slightly vary, and in some cases where a measurement error occurred, may significantly deviate from the computed slopes of the other clusters. Then, for each cluster, a linear regression line may be plotted which passes through the identified true root of said cluster and which has the computed slope.

In one or more additional steps, low quality clusters are identified. A low quality cluster is a cluster whose data points or any other feature derived from said data points does not meet at least one quality criteria. For example, clusters comprising at least a predefined fraction of data points whose signal-to-noise ratio is below a predefined minimum signal-to-noise-ratio threshold are filtered out. In addition or alternatively, clusters whose computed slope deviates by more than a predefined threshold value (e.g. >5°, >10°, >15°) from the average slope of the majority (e.g. 60%, 70% or 80%) of the identified clusters may be identified as low quality clusters. In addition or alternatively, the variability of the data points of a cluster may be determined, e.g. by using an error function for determining the distance ("error") of each data point of the cluster from its nearest point in the linear regression line of said cluster. Clusters in which a total error score provided by the error function exceeds a threshold are identified as low quality clusters. For example, the error score may be computed as the sum of squared error values obtained for each data point of the cluster.

In a further step, all identified low quality clusters are filtered out from further analysis.

In a final step, selectively the clusters not being filtered out as "low quality clusters" are used for identifying the "true" TOF value. For example, the average slope of the linear regression line from all remaining clusters (having sufficient quality) is computed. As the slopes of one half of the dusters will be mirror-inverted to the slopes of the other half of the clusters, this step may involve an inversion operation on the regression line slopes of half of the clusters. The resulting average slope is used for identifying the true TOF: the computed average slope $$\left(\frac{\partial \text{phase } shif}{\partial US - \text{frequency}}\right)$$

indicates the change in the measured phase shift per change of US-frequency. As the change in frequency is known, the resulting ∂phase shift value derived from the average of all linear regression line slopes of high-quality clusters can be used for identifying the true TOF.

For example, the identification of the true TOFs using said average slope may be performed as follows:

$$Slope_{avg} = \frac{\text{delta} - phase_{avg}}{\frac{\text{triangle} - \text{wavelength}}{2}} = \frac{2*VO_{max}}{\text{triangle} - wavelengt} = \frac{2*\text{phase}}{\text{triangle} - wavelengt} = 2*\pi*TOF.$$

Thus, $$TOF = \frac{Slope_{avg}}{2\pi} = \frac{\frac{dphase}{dfreq}}{2\pi}.$$

The VO stands for voltage. $VO_{max}$ is the maximum Voltage output of the phase comparator. Each linear section in the triangle wave represents a half period.

For example, the output of the phase comparator may vary (depending on the type and configuration of the phase comparator) between 0 and 1.8 V. This equation can be used to calculate a TOF value by:

dphase/dfreq=2pi*TOF.

TOF=(½pi rad)*Xdphase/dfreq

Thereby, "rad" represents radians and dphase/dfreq is measured in units of voltage/MHz. In the next step, this unit is converted to ns to get a TOF value.

At first, the volts are converted to radians because there are pi radians over VOmax, i.e., over 1.8 Volts.

TOF=(½pi rad)*(pi rad/1.8 V)*(1000 ns/1 us)*Xd-phase/dfreq [in units of Volts/MHz]

Radians and voltage cancel and the μs and MHz also cancel so what is left is:

TOF(ns)=(1000/3.6)*Xdphase/freq in V/MHz.

Thus, TOF in nanoseconds will be equal to the slope of the phase-frequency curve when in units of V/MHz multiplied by 1000/3.6
e.g. a change of one nanosecond:

TOF=(1000/3.6)*X

X=(3.6/1000)*1 ns

X=0.0036 V/MHz

So to change the TOF 1 ns the slope of the phase frequency sweep would change 3.6 mV/MHz.

Likewise, the TOF can be calculated from $$\frac{2*VO_{max}}{\text{triangle} - wavelengt}.$$

Thus, $$TOF = \frac{Slope_{avg}}{2\pi} = \frac{\frac{dphase}{dfreq}}{2\pi}.$$

The slope of the triangle wave is inversely proportional to the wavelength of the US-signal used. The wavelength of a triangle wave has units of MHz because the x-axis represents frequencies of the acoustic signal.

According to embodiments, a set of acoustic signals respectively having one of a plurality N of different frequencies is transmitted from a transmitter to a receiver. The transmitter and receiver are positioned such that the frequency passes through the material before encountering the receiver. For the acoustic signals at each of the N different frequencies, a phase shift $\varphi_{exp}$ of the acoustic signal received by the receiver relative to the phase of the transmitted acoustic signal is experimentally determined and a corresponding experimental TOF value is calculated by:

generating a measured triangle wave 661, the measured triangle wave indicating, for each of the plurality N of frequency values the respectively measured phase shift $\varphi_{exp}$;

determining a plurality of linear sections 890, 892, 894 in the measured triangle wave, the data points of the measured triangle wave lying on or next to the linear section constituting a respective cluster of data points;

performing a linear regression on the data points of each of the clusters for computing a regression line for said cluster and for determining a slope of said regression line; analyzing the slope of the regression line and/or the distance of the data points of the cluster from said regression line for identifying low quality clusters; for example, any user defined quality-threshold could be set for a particular system and application. In the embodiment depicted e.g. in FIG. 8e, for example, linear sections that have an R2 value of less than 0.998 are considered as "low quality clusters" and are not used for computing the average slope and therefrom the true TOF value; computing an average slope selectively from the slopes of the regression line of all clusters not being low quality clusters;

computing a TOF from the average slope; (for example, an average value of all slopes (delta-phaseshift/delta US-frequency) of all regression lines of all clusters not being identified as low-quality clusters is computed. This averaged slope is used to compute the "true TOF" value e.g. according to: $Slope_{avg}$=delta-phase$_{avg}$/(triangle-wavelength/2)=2*phase/triangle-wavelength=2*π*TOF. Thus, $$TOF = \frac{Slope_{avg}}{2\pi} = \frac{\frac{dphase}{dfreq}}{2\pi}.$$

and returning said computed TOF.

According to some embodiments, the measurements obtained from a frequency sweep measurement may be discarded completely in case the number of clusters being identified as low quality clusters exceeds a predefined quality threshold. In this case, a warning message may be output to the user or a new frequency sweep measurement may be performed automatically.

The above mentioned steps may be performed, for example, by a processor of the signal analysis system.

Said feature may have the advantage that the "true" TOF is computed in a more robust manner. Instead of dealing with the whole frequency sweep to find a "best fit" and therefore the most probable TOF value, this algorithm identifies and filters out individual linear sections of a measured phase-frequency triangle wave having low quality, thereby improving the data quality of the data based on which the true TOF is computed. This technique can be used to identify and remove bad quality data from the TOF calculation or identifying entire frequency sweep scans that have to be discarded due to low data quality.

III. Applications of the Present Systems and Methods

TOF measurements are known to be useful for many applications, including distance measurements and compositional analysis. The present systems and methods are contemplated to be used in any system that utilizes a TOF measurement, including, for example, methods relying on TOF measurements with nanosecond to sub-nanosecond sensitivity. In one specific embodiment, the present systems and methods are applied to the field monitoring diffusion of fluids into porous materials.

In one aspect, the invention relates to a method of obtaining a tissue sample that is sufficiently diffused with a liquid. The method comprises:
  (a) immersing the tissue sample into a volume of the liquid;
  (b) tracking diffusion of the liquid through the tissue sample by:
    (b1) transmitting an acoustical signal from a transmitter through the tissue sample when the tissue sample is immersed in the liquid;
    (b2) detecting the transmitted acoustical signal after the transmitted acoustical signal has passed through the tissue sample;
    (b3) calculating time of flight (ToF) of the acoustical signal on a computing system comprising a processor by executing on the processor a set of instructions comprising the method of any of the embodiments of the TOF determination methods b1, b2 or b3 or combinations thereof; and
    (b4) repeating (b1)-(b3) until the calculated ToF reaches a predefined threshold value, wherein the predefined threshold value indicates that the tissue sample is sufficiently diffused with the liquid.

For example, a typical TOF that is expected for a tissue sample of a particular size, shape, tissue source and being diffused to a given percentage by a particular liquid (e.g. a fixation liquid such as formalin) and being examined in a particular system comprising a particular configuration of the transducers (US signal frequency, transducer distance, etc) can be determined empirically for a tissue sample of which all said properties are known and the determined TOF values can be used as a reference value. For example, a reference table could comprise expected TOF values for particular tissue sample of a particular size and shape (e.g. cylinders with 6 mm diameter), of a particular source (tonsil), of a particular degree volume or weight fraction of formalin (e.g. 10% formalin throughout the tissue sample), for a particular configuration of the acoustic monitoring system that has performed the TOF measurement. Said reference values may be used as threshold values for identifying if a sample of a particular type in a particular setting of the acoustic monitoring system and to be stained or fixed according to a particular protocol is considered as being sufficiently diffused.

For example, the tissue sample can be an unfixed tissue sample freshly obtained from a subject and the liquid can be a fixative solution. According to embodiments, the fixative solution is a cross-linking fixative solution.

According to embodiments, the cross-linking fixative is at a temperature from 0° C. to 15° C.

According to embodiments, the temperature of the tissue sample and the liquid is kept at a temperature from 0° C. to 15° C. at least while performing the steps a) and b1-b4). This is to ensure that the proteins and other components of the sample are protected from decay by the low temperatures at least until the TOF measurement indicates that a sufficient concentration of the fixation liquid has diffused into the sample.

In some embodiments, the sample may be kept at said reduced temperatures also some time after a sufficient concentration of the fixation solution is reached. For example, some sample types may be kept for several hours or even days in a refrigerator before the fixation step at room temperature or at increased temperatures in the range of 20-50° C. starts.

Alternatively, immediately upon the predefined threshold value is reached, the temperature of the tissue sample and the liquid may be allowed to rise to the ambient temperature (e.g. by turning of the cooling facilities) or may be actively heated to a temperature of more than 20° C.

In one particular embodiment, the porous material is a tissue sample. In many common tissue analysis methods, the tissue sample is diffused with a fluid solution. For example, Hine (Stain Technol. 1981 March; 56(2):119-23) discloses a method of staining whole tissue blocks by immersing a tissue sample in a hematoxylin solution and eosin solution after fixation and prior to embedding and sectioning. Additionally, fixation is frequently performed by immersing an unfixed tissue sample into a volume of fixative solution, and the fixative solution is allowed to diffuse into the tissue sample. As demonstrated by Chafin et al., (PLoS ONE 8(1): e54138. doi:10.1371/journal.pone. 0054138 (2013)), a failure to ensure that a fixative has sufficiently diffused into the tissue can compromise the integrity of the tissue sample.

In one embodiment, the present systems and methods are applied to monitor diffusion of a fixative into a tissue sample. As fixative solution penetrates into tissue, it displaces interstitial fluid. This fluid exchange slightly changes the composition of the tissue volume because interstitial fluid and fixative solution have discrete sound velocities. The output ultrasound pulse thus accumulates a transit time differential that increases as more fluid exchange occurs. This enables operations such as determining the phase differential accumulated by diffusion based on the geometry of the tissue sample, obtaining the TOF, and using post-processing algorithms to correct for errors and other artifacts in the obtained TOF and outputting a reliable TOF. The rate of diffusion may be monitored by a system of acoustic probes based on the different acoustic properties of fixative-soaked tissue samples. In other words, solid tissue samples may be contacted with a liquid fixative that travels through the tissue samples and diffuses throughout substantially the entire thickness of the tissue samples, and being analyzed based on acoustic characteristics that are continuously or periodically monitored to evaluate the state and condition of the tissue sample throughout processing. For example, a fixative such as formalin having a bulk modulus greater than interstitial fluid can significantly alter the TOF as it displaces the interstitial fluid. In the fixation process (e.g., a cross-linking process), the speed of transmission of acoustic energy can change as the tissue sample becomes more heavily cross-linked. Real-time monitoring can be used to accurately track movement of the fixative through the sample. For example, a diffusion or fixation status of a biological sample can be monitored based on a time of flight (TOF) of acoustic waves. Other examples of measurements include acoustic signal amplitude, attenuation, scatter, absorption, phase shifts of acoustic waves, or combinations thereof. The movement of the fixative through the tissue sample may be monitored in real-time. Based on the obtained information, a fixation protocol may be adjusted to enhance processing consistency, reduce processing times, improve processing quality, or the like. Thus, in an embodiment, a system is provided comprising an acoustic monitoring system as substantially described herein, a container adapted to hold a tissue sample immersed in a fixative solution, and a signal analyzer as substantially described herein. The acoustic monitoring system comprises at least one transmitter/receiver pair arranged on, in or around the container such that an acoustic signal (including an ultrasonic acoustic signal) is passed through the tissue sample before being detected by the receiver. In another embodiment, at least a second transmitter/receiver pair is arranged on, in or around the container such that an acoustic signal transmitted from the transmitter will pass through the fixative solution, but not the tissue sample, before being detected by the receiver. This second transmitter pair may serve as a reference for monitoring changes to the fixative solution. Additionally, the system may include elements for controlling for environmental fluctuations of the container, such as temperature control elements and the like.

In an embodiment, the forgoing diffusion monitoring systems and methods are used to run a two-temperature immersion fixation method on a tissue sample. As used herein, a "two-temperature fixation method" is a fixation method in which tissue is first immersed in cold fixative solution for a first period of time, followed by heating the tissue for the second period of time. The cold step permits the fixative solution to diffuse throughout the tissue without substantially causing cross-linking. Then, once the tissue has adequately diffused throughout the tissue, the heating step leads to cross-linking by the fixative. The combination of a cold diffusion followed by a heating step leads to a tissue sample that is more completely fixed than by using standard methods. Thus, in an embodiment, a tissue sample is fixed by: (1) immersing an unfixed tissue sample in a cold fixative solution and monitoring diffusion of the fixative into the tissue sample by monitoring TOF in the tissue sample using the systems and methods as disclosed herein (diffusion step); and (2) allowing the temperature of the tissue sample to raise after a threshold TOF has been measured (fixation step). In exemplary embodiments, the diffusion step is performed in a fixative solution that is below 20° C., below 15° C., below 12° C., below 10° C., in the range of 0° C. to 10° C., in the range of 0° C. to 12° C., in the range of 0° C. to 15° C., in the range of 2° C. to 10° C., in the range of 2° C. to 12° C., in the range of 2° C. to 15° C., in the range of 5° C. to 10° C., in the range of 5° C. to 12° C., in the range of 5° C. to 15° C. In exemplary embodiments, the environment surrounding the tissue sample is allowed to rise within the range of 20° C. to 55° C. during the fixation step. In certain embodiments, the fixative is an aldehyde-based cross-linking fixative, such as glutaraldehyde- and/or formalin-based solutions. Examples of aldehydes frequently used for immersion fixation include:

formaldehyde (standard working concentration of 5-10% formalin for most tissues, although concentrations as high as 20% formalin have been used for certain tissues);
glyoxal (standard working concentration 17 to 86 mM);
glutaraldehyde (standard working concentration of 200 mM).

Aldehydes are often used in combination with one another. Standard aldehyde combinations include 10% formalin+1% (w/v) Glutaraldehyde. Atypical aldehydes have been used in certain specialized fixation applications, including: fumaraldehyde, 12.5% hydroxyadipaldehyde (pH 7.5), 10% crotonaldehyde (pH 7.4), 5% pyruvic aldehyde (pH 5.5), 10% acetaldehyde (pH 7.5), 10% acrolein (pH 7.6), and 5% methacrolein (pH 7.6). Other specific examples of aldehyde-based fixative solutions used for immunohistochemistry are set forth in Table 1:

TABLE 1

| Solution | Standard Composition |
| --- | --- |
| Neutral Buffered Formalin | 5-20% formalin + phosphate buffer (pH ~6.8) |
| Formal Calcium | 10% formalin + 10 g/L calcium chloride |
| Formal Saline | 10% formalin + 9 g/L sodium chloride |
| Zinc Formalin | 10% formalin + 1 g/L zinc sulphate |
| Helly's Fixative | 50 mL 100% formalin + 1 L aqueous solution containing 25 g/L potassium dichromate + 10 g/L sodium sulfate + 50 g/L mercuric chloride |
| B-5 Fixative | 2 mL 100% formalin + 20 mL aqueous solution containing 6 g/L mercuric chloride + 12.5 g/L sodium acetate (anhydrous) |
| Hollande's Solution | 100 mL 100% formalin + 15 mL Acetic acid + 1 L aqueous solution comprising 25 g copper acetate and 40 g picric acid |
| Bouin's Solution | 250 mL 100% formalin + 750 mL saturated aqueous picric acid + 50 mL glacial acetic acid |

In certain embodiments, the fixative solution is selected from Table 1. In some embodiments, the aldehyde concentration used is higher than the above-mentioned standard concentrations. For example, a high-concentration aldehyde-based fixative solution can be used having an aldehyde concentration that is at least 1.25-times higher than the standard concentration used to fix a selected tissue for immunohistochemistry with a substantially similar composition. In some examples, the high-concentration aldehyde-based fixative solution is selected from: greater than 20% formalin, about 25% formalin or greater, about 27.5% formalin or greater, about 30% formalin or greater, from about 25% to about 50% formalin, from about 27.5% to about 50% formalin, from about 30% to about 50% formalin, from about 25% to about 40% formalin, from about 27.5% to about 40% formalin, and from about 30% to about 40% formalin. As used in this context, the term "about" shall encompass concentrations that do not result in a statistically significant difference in diffusion at 4° C. as measured by Bauer et al., *Dynamic Subnanosecond Time-of-Flight Detection for Ultra-precise Diffusion Monitoring and Optimization of Biomarker Preservation*, Proceedings of SPIE, Vol. 9040, 90400B-1 (2014 Mar. 20).

Two-temperature fixation processes are especially useful for methods of detecting certain labile biomarkers in tissue samples, including, for example, phosphorylated proteins, DNA, and RNA molecules (such as miRNA and mRNA). See PCT/EP2012/052800 (incorporated herein by reference). Thus, in certain embodiments, the fixed tissue samples obtained using these methods can be analyzed for the presence of such labile markers. Thus in an embodiment, a method of detecting a labile marker is a sample is provided, said method comprising fixing the tissue according to a two-temperature fixation as disclosed herein and contacting the fixed tissue sample with an analyte binding entity capable of binding specifically to the labile marker. Examples of analyte-binding entities include: antibodies and antibody fragments (including single chain antibodies), which bind to target antigens; t-cell receptors (including single chain receptors), which bind to MHC:antigen complexes; MHC: peptide multimers (which bind to specific T-cell receptors); aptamers, which bind to specific nucleic acid or peptide targets; zinc fingers, which bind to specific nucleic acids, peptides, and other molecules; receptor complexes (including single chain receptors and chimeric receptors), which bind to receptor ligands; receptor ligands, which bind to receptor complexes; and nucleic acid probes, which hybridize to specific nucleic acids. For example, an immunohistochemical method of detecting a phosphorylated protein in a tissue sample is provided, the method comprising contacting the fixed tissue obtained according to the foregoing two-temperature fixation method with an antibody specific for the phosphorylated protein and detecting binding of the antibody to the phosphorylated protein. In other embodiments, an in situ hybridization method of detecting a nucleic acid molecule is provided, said method comprising contacting the fixed tissue obtained according to the foregoing two-temperature fixation method with a nucleic acid probe specific for the nucleic acid of interest and detecting binding of the probe to the nucleic acid of interest.

In one specific, non-limiting example, a system was developed for monitoring diffusion of fluid into tissue samples. Pairs of 4 MHz focused transducers (CNIRHurricane Tech (Shenzhen) Co., Ltd.) are spatially aligned and a sample is placed close to their common foci my designing a mechanical head was designed in Solidworks® to fit around and seal a standard reagent canister of a Lynx II dip and dunk tissue processor (Electron Microscopy Sciences). A cassette holder was designed for use with a biopsy compatible cassette (Leica Biosystems, CellSafe Biopsy Capsules) to securely hold smaller tissue samples (dia.≤4 mm) and prevent them from slipping. Alternatively, a separate holder was designed for a standard sized cassette for larger specimens up to 7 mm in diameter. The cassette holder was attached to a vertical translation arm that translates the cassette into the reagent canister and passes the tissue through the acoustic path of the transducers. Two metal brackets on either side of the tissue cassette housed the transmitting and receiving transducers. The receiving bracket also held a pair of transducers oriented orthogonal to the other transducers, to measure only the bulk fluid. These transducers served as a reference channel to compensate for environmentally-induced fluctuations in the bulk fluid. One transducer of each pair, designated the transmitter, sends out an acoustic pulse that traverses the fixative fluid and tissue and is detected by the receiving transducer. Initially, the transmitting transducer can be programmed with a waveform generator such as the AD5930 by Analog Devices® to transmit a sinusoidal wave for several hundred microseconds. That pulse train may then be detected by the receiving transducer after traversing the fluid and tissue. The received ultrasound sinusoid and the transmitted sinusoid are compared using, for instance, a digital phase comparator such as the AD8302 by Analog Devices. The output of the phase comparator yields a valid reading during the region of temporal overlap between the transmitted and received pulses. The output of the phase comparator is allowed to stabilize before the output is queried with an integrated analog to digital converter on the microcontroller, such as the ATmega2560 by Atmel®. The process may then be repeated at multiple acoustic frequencies across the bandwidth of the transducer to build up the phase relationship between the input and output sinusoids across a frequency range. This acoustic phase-frequency sweep is directly used to calculate the TOF using a post-processing algorithms disclosed herein. Additionally, the speed of sound in fluid has a large temperature dependence (e.g. $\Delta t_{water} \approx 2.3$ ns/(° C.·mm) at 4° C.) that is exasperated because the absolute TOF is an integrated signal over the path length of the transducers. Two mechanisms can be used to mitigate these environmental fluctuations: a proportional-integral-derivative (PID) algorithm on temperature control hardware and TOF reference compensation through the bulk media. The PID temperature control was based on a developed pulse width modulation (PWM) algorithm that continually reads the temperature of the reagent from a thermistor (such as an Omega model TH-10-44007) and adjusts how long the temperature control hardware is on. Best results were achieved with relatively slow low amplitude thermal transients in the fluid. The PWM algorithm was found to normalize the temperature of the fluid with a standard deviation of roughly 0.05° C. about the set point. Further environmental control can be realized by reading the TOF through the bulk fixative, which reading was then subtracted from the signal from the reagent and tissue to mitigate contributions to the TOF from environmentally-induced fluctuations in the fluid.

III. Further Embodiments of the Disclosed Systems and Methods

Embodiment 1

A method of obtaining a tissue sample (910) that is sufficiently diffused with a liquid, said method comprising: (a) immersing the tissue sample into a volume of the liquid; (b) tracking diffusion of the liquid through the tissue sample by: (b1) transmitting an acoustical signal from a transmitter (902) through the tissue sample when the tissue sample is immersed in the liquid; (b2) detecting the transmitted acoustical signal after the transmitted acoustical signal has passed through the tissue sample by a receiver (904); (b3) calculating time of flight (ToF) of the acoustical signal on a computing system comprising a processor (205); and (b4) repeating (b1)-(b3) until the calculated ToF reaches a predefined threshold value, wherein the predefined threshold value indicates that the tissue sample is sufficiently diffused with the liquid.

Embodiment 2

The method of embodiment 1, wherein the tissue sample is an unfixed tissue sample freshly obtained from a subject and the liquid is a fixative solution.

Embodiment 3

The method of embodiment 2, wherein the fixative solution is a cross-linking fixative solution.

Embodiment 4

The method of embodiment 3, wherein the cross-linking fixative is at a temperature from 0° C. to 15° C.

Embodiment 5

The method of any of embodiments 1-4, further comprising keeping the temperature of the tissue sample and the liquid at a temperature from 0° C. to 15° C. at least while performing the steps (a) and (b1)-(b4).

Embodiment 6

The method of embodiment 5, further comprising upon the predefined threshold value is reached, allowing the temperature of the tissue sample and the liquid to rise to the ambient temperature or heating the temperature of the tissue sample and the liquid to a temperature of more than 20° C.

Embodiment 7

The method of any of embodiments 1-6, with step (b1) being performed by transmitting a set of acoustic signals (920) respectively having a plurality (N) of different frequencies from the transmitter to the receiver, wherein the transmitter and receiver are positioned so that the frequency passes through the material before encountering the receiver, step (b2) being performed for each of the set of acoustic signals received by the receiver; the method further comprising: measuring a phase shift ($\varphi_{exp}$) of each of the acoustic signals received (922) by the receiver relative to the phase of the transmitted acoustic signal (920) at each of the (N) different frequencies; the calculation of the TOF in step (b3) being performed by: calculating, for each of the frequencies and for each of a plurality (M) of predefined candidate TOF values, a respective candidate phase shift ($\varphi_{cand}$); obtaining an error function, the error function indicating, for each of the candidate phase shifts computed for a particular frequency, the distance between said calculated candidate phase and the phase shift ($\varphi_{exp}$) having been measured for said frequency; generating an envelope function of the error function; identifying a minimum of the error function, the minimum being indicative of a phase shift value lying in a curve of the error function and having a minimum difference from the phase shift measured for said frequency; using said indicated phase shift value for computing a result TOF value for said frequency; calculating the average of all the TOFs having been identified for each of the plurality (N) of frequencies; and returning the average TOF.

Embodiment 8

The method of embodiment 7, the error function being an interferogram.

Embodiment 9

The method of embodiment 7 or 8, wherein the envelope function is generated by performing a Hilbert transform of the error function.

Embodiment 10

The method of any one embodiments 1-6, with step (b1) being performed by transmitting a set of acoustic signals (920) respectively having a plurality (N) of different frequencies from the transmitter to the receiver, wherein the transmitter and receiver are positioned so that the frequency passes through the material before encountering the receiver, step (b2) being performed for each of the set of acoustic signals received by the receiver; the method further comprising: measuring a phase shift ($\varphi_{exp}$) of each of the acoustic signals received (922) by the receiver relative to the phase of the transmitted acoustic signal (920) at each of the (N) different frequencies; the calculation of the TOF in step (b3) being performed by: generating a measured triangle wave (661), the measured triangle wave indicating, for each of the plurality (N) of frequency values the respectively measured phase shift ($\varphi_{exp}$); calculating, for each of the frequencies and for each of a plurality (M) of predefined candidate TOF values, a respective candidate phase shift ($\varphi_{cand}$); generating, for each of the calculated candidate phase shifts, a candidate triangle wave (662), the candidate triangle wave indicating, for each of the plurality (M) of candidate TOFs and for a particular one of the plurality (N) of frequencies, the respectively calculated candidate phase shift ($\varphi_{cand}$); comparing one or more of the candidate triangle waves respectively with the measured triangle wave for identifying the one of the candidate triangle waves matching closest with the measured candidate triangle wave; and returning the candidate TOF having been used for calculating the candidate phase shift used for generating the closest matching candidate triangle wave.

Embodiment 11

The method of embodiment 10, further comprising: accessing a plurality (R) of predefined candidate offsets for the candidate triangle waves; supplementing the generated candidate triangle waves by, for each of the candidate triangle waves and for each of the plurality (R) of candidate offsets, an additional candidate triangle wave by shifting said candidate triangle wave by said candidate offset; and, the comparison of the candidate triangle waves with the measured triangle wave including also the comparison of one or more of the supplementary candidate triangle waves with the measured triangle wave.

Embodiment 12

The method of any one of embodiments 10-11, further comprising normalizing the amplitudes of the measured triangle wave and each of the candidate triangle waves before comparing the triangle wave comparison.

Embodiment 13

The method of any one of embodiments 10-12, wherein the triangle wave comparison includes using an error function for determining the distance between each of the compared candidate triangle wave and the measured triangle wave, the candidate triangle wave matching closest with the measured triangle wave being the one of the one or more candidate triangle waves whose distance according to the error function is minimal.

Embodiment 14

The method of embodiment 13, further comprising generating the error function as a function quantifying a point-by-point squared sum difference of the candidate triangle wave and the measured triangle wave.

Embodiment 15

The method of embodiment 14, wherein the closest-matching candidate frequency wave is the one of the candidate triangle wave having a minimum of the error function.

Embodiment 16

The method of any one of embodiments 10-15, wherein the comparison is implemented as a loop process over the plurality (M) of candidate triangle waves sorted according to the candidate TOF having been used for computing the candidate triangle waves, the loop process being aborted upon determining that the one of the candidate frequencies is varied until the one of the candidate triangle waves matching closest with the measured candidate triangle wave is obtained.

Embodiment 17

The method of any one of embodiments 10-16, wherein the error function is plotted on a 3D graph as a function of the plurality (M) of candidate TOFs and the plurality (R) of candidate offsets.

Embodiment 18

The method of any one of embodiments 13-17, further comprising: generating an envelope function of the error function; identifying a minimum of the error function, the minimum being indicative of a minimum difference of the candidate triangle wave and the measured triangle wave phase shift, the minimum of the error function corresponding to a particular TOF that can be extrapolated from the envelope function; and, returning said particular TOF.

Embodiment 19

The method of any one of embodiments 1-6, with step (b1) being performed by transmitting a set of acoustic signals (920) respectively having a plurality (N) of different frequencies from the transmitter to the receiver, wherein the transmitter and receiver are positioned so that the frequency passes through the material before encountering the receiver, step b2) being performed for each of the set of acoustic signals received by the receiver; the method further comprising: measuring a phase shift ($\varphi_{exp}$) of each of the acoustic signals received (922) by the receiver relative to the phase of the transmitted acoustic signal (920) at each of the (N) different frequencies; the calculation of the TOF in step b3) being performed by: generating a measured triangle wave (661), the measured triangle wave indicating, for each of the plurality (N) of frequency values the respectively measured phase shift ($\varphi_{exp}$); determining a plurality of linear sections (890, 892, 894) in the measured triangle wave, the data points of the measured triangle wave lying on or next to the linear section constituting a respective cluster of data points; performing a linear regression on the data points of each of the clusters for computing a regression line for said cluster and for determining a slope of said regression line; analyzing the slope of the regression line and/or the distance of the data points of the cluster from said regression line for identifying low quality clusters; computing an average slope selectively from the slopes of the regression line of all clusters not being low quality clusters; computing a TOF from the average slope; and returning said computed TOF.

Embodiment 20

The method of embodiment 19, further comprising, for each of the identified linear sections: identifying the one of the data points of the cluster constituted by said linear section having minimum distance to a phase shift value of "0" as the root data point of said cluster; wherein the regression line of said cluster is created such that it traverses the root data point.

Embodiment 21

The method of any one of embodiments 19-20, further comprising calculating a confidence measure for each individual linear section and identifying clusters of linear section whose confidence measure is below a quality threshold as low quality cluster.

Embodiment 22

The method of any one of embodiments 19-21, further comprising: automatically determining if a threshold number of low quality clusters was identified; and if so, triggering the outputting of a recommendation message to repeat the ultrasound frequency sweep or automatically triggering the repeating of steps (a) and (b).

Embodiment 23

The method of any one of embodiments 7-22, the plurality of candidate TOFs covering a range of 10 µs—30 µs and being respectively separated by a distance of less than 10 ns, more preferentially less than 1 ns, more preferentially less than 500 ps and more preferentially less than 250 ps from each other.

Embodiment 24

The method of any one of the previous embodiments, with the TOF calculation in step (b3) having a temporal resolution of a nanosecond, more preferentially of less than a nanosecond.

Embodiment 25

The method of anyone of the previous embodiments, wherein the transmitter and the receiver are transducers of an acoustic monitoring system, the acoustic monitoring system being operatively coupled to a computer system comprising a processor and computer-interpretable instructions on a computer-readable, non-transitory medium, the instructions causing the processor to process the measured phase shifts provided by the acoustic monitoring system and information on the plurality (N) of frequencies applied on the biological sample for performing step 3b according to the method of any one of the previous embodiments.

Embodiment 26

The method of anyone of the previous embodiments, further comprising: after determining that the calculated TOF has reached a predefined threshold value, fixing the tissue sample by actively or passively raising the temperature of the tissue sample; contacting the fixed tissue sample with a specific binding entity capable of binding to the labile biomarker; and detecting binding of the specific binding entity.

Embodiment 27

A system for monitoring diffusion of a liquid into a tissue sample comprising a signal analysis system communicatively coupled to the transmitter and receiver, the signal analysis system comprising processor configured to performing step 3b according to any one of embodiments 1-26 and to generate a signal when the calculated TOF reaches the predefined threshold.

Embodiment 28

A computer-implemented method for accurately calculating a time-of-flight of an acoustic signal traversing through a material (910), the method comprising: transmitting a frequency sweep of the acoustical signal between a transmitter (902) and a receiver (904), wherein the transmitter and receiver are positioned so that the frequency passes through the material before encountering the receiver; detecting the frequency sweep of the acoustic signal with the receiver; calculating time of flight of the acoustical signal on a computer system by: obtaining an error function of a frequency sweep of the acoustic signal; and generating an envelope of the error function; wherein the time-of-flight is based on a minimum of the error function.

Embodiment 29

The method of embodiment 28, wherein the error function is obtained by performing the frequency sweep across a plurality of acoustic frequencies obtained from an acoustic monitoring system.

Embodiment 30

The method of embodiment 29, wherein the error function is an interferogram.

Embodiment 31

The method of any one of embodiments 28-30, wherein the envelope is generated by performing a Hilbert transform of the error function.

Embodiment 32

The method of any one of embodiments 28-31, further comprising plotting the time-of-flight based on the minimum of the envelope.

Embodiment 33

A computer-implemented method for accurately calculating a time-of-flight of an acoustic signal traversing through a material, the method comprising: generating a frequency sweep of the acoustic signal; and comparing a candidate triangle wave with the frequency sweep over a plurality of candidate frequencies and a plurality of candidate phases; wherein the time-of-flight is calculated based on a closest-matching candidate frequency and candidate phase.

Embodiment 34

The method of embodiment 33, wherein an amplitude of the candidate triangle wave is normalized based on an amplitude of the frequency sweep.

Embodiment 35

The method of embodiment 33, wherein the comparing includes determining an error between the candidate triangle wave and the frequency sweep.

Embodiment 36

The method of embodiment 35, further comprising generating an error function based on the error, wherein the error function comprises a point-by-point squared sum difference of the candidate triangle wave and the frequency sweep.

Embodiment 37

The method of embodiment 36, wherein the closest-matching candidate frequency and candidate phase are found based on a minimum of the error function.

Embodiment 38

The method of embodiment 37, wherein the plurality of candidate frequencies is varied until the minimum of the error function is obtained.

Embodiment 39

The method of embodiment 37 or 38, wherein the plurality of phases is varied until the minimum of the error function is obtained.

Embodiment 40

The method of any one of embodiments 36-39, wherein the error function is plotted on a 3D graph as a function of the candidate TOF and the candidate phase.

Embodiment 41

The method of any one of embodiments 36-39, wherein the time-of-flight is calculated from the minimum of the error function.

Embodiment 42

A computer-implemented method for accurately calculating a time-of-flight of an acoustic signal traversing through a material, the method comprising: determining a plurality of individual linear sections of an ultrasound frequency sweep of the acoustic signal; and performing a linear regression on each individual linear section to determine an average slope; wherein the time-of-flight is calculated based on the average slope.

Embodiment 43

The method of embodiment 42, wherein each individual linear section is determined by finding a plurality of potential roots and a single true root within the frequency sweep.

Embodiment 44

The method of embodiment 43, wherein the linear regression is performed around the true root.

Embodiment 45

The method of any one of embodiments 42-44, further comprising calculating a confidence measure for each individual linear section.

Embodiment 46

The method of embodiment 45, wherein individual linear sections having low confidence measures are discarded prior to determining the time-of-flight.

Embodiment 47

The method of embodiment 45 or 46, wherein a threshold number of low-confidence linear sections triggers a recommendation to repeat the ultrasound frequency sweep.

Embodiment 48

A method of fixing a tissue sample, said method comprising: obtaining a tissue sample sufficiently diffused with a cross-linking fixative solution by: (a1) immersing an unfixed tissue sample freshly obtained from a subject into a volume of the cross-linking fixative solution, said cross-linking fixative solution; (a2) tracking diffusion of the cross-linking fixative solution through the tissue sample by: (a2a) transmitting an acoustical signal from a transmitter through the tissue sample when the tissue sample is immersed in the cross-linking fixative solution; (a2b) detecting the transmitted acoustical signal after the transmitted acoustical signal has passed through the tissue sample; (a2c) calculating time of flight (ToF) of the acoustical signal on a computing system comprising a processor by executing on the processor a set of instructions comprising the method of any of embodiments 28-46; and (a2d) repeating (a2a)-(a2c) until the calculated ToF reaches a predefined threshold value, wherein the predefined threshold value indicates that the tissue sample is sufficiently diffused with the cross-linking fixative solution; raising the temperature of the tissue sample after the tissue sample is sufficiently diffused with the cross-linking fixative solution to a temperature in the range of room temperature to 50° C., and holding the tissue sample in said range of temperatures for a period of time sufficient to allow fixation of the tissue sample.

Embodiment 49

A method of detecting a labile biomarker in a tissue sample, said method comprising: fixing the tissue sample according to the method of embodiment 48 to obtain a fixed tissue sample; contacting the fixed tissue sample with a specific binding entity capable of binding to the labile biomarker; and detecting binding of the specific binding entity.

Embodiment 50

The method of embodiment 49, wherein the labile biomarker is selected from the group consisting of a phosphorylated protein, an mRNA, and a miRNA.

Embodiment 51

A system for monitoring diffusion of a liquid into a tissue sample comprising: a container for immersing the tissue sample in a volume of the liquid; a transmitter arranged in or around the container in a position that permits transmission of the acoustical signal through the tissue sample when the tissue sample is immersed in the volume of liquid in the container; a receiver arranged in or around the container at a fixed distance from the transmitter and positioned to receive the acoustical signal after the acoustical signal has been transmitted through the tissue sample; a computing device communicatively coupled to the transmitter and receiver, the computing device configured to: (d1) calculate a time of flight (ToF) of the acoustical signal between the transmitter and receiver according to a method of any of embodiments 28-46; and (d2) generate a signal when the ToF reaches a predetermined threshold.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

We claim:

1. A method of obtaining a tissue sample that is sufficiently diffused with a fixative, said method comprising: (a) immersing an unfixed tissue sample into a volume of the fixative, wherein the fixative comprises a temperature raging from between about 0° C. to about 15° C.; (b) tracking diffusion of the fixative through the unfixed tissue sample by: (b1) transmitting an acoustical signal from a transmitter through the unfixed tissue sample when the tissue sample is immersed in the fixative; (b2) detecting the transmitted acoustical signal after the transmitted acoustical signal has passed through the unfixed tissue sample by a receiver; (b3) calculating time of flight (ToF) of the acoustical signal on a computing system comprising a processor; and (b4) repeating (b1)-(b3) until the calculated ToF reaches a predefined threshold value, wherein the predefined threshold value indicates that the unfixed tissue sample is sufficiently diffused with the fixative, wherein the unfixed tissue sample and the fixative are maintained at a temperature ranging from between about 0° C. to about 15° C. while performing the steps (b1)-(b4).

2. The method of claim 1, wherein the fixative solution is a cross-linking fixative solution.

3. The method of claim 2, wherein the cross-linking fixative is at a temperature from about 0° C. to about 15° C.

4. The method of claim 1, further comprising upon the predefined threshold value is reached, allowing the temperature of the tissue sample and the fixative to rise to the ambient temperature or heating the temperature of the tissue sample and the fixative to a temperature of more than about 20° C.

5. The method of claim 1, wherein step (b1) is performed by transmitting a set of acoustic signals respectively having a plurality (N) of different frequencies from an ultrasonic transmitter to an ultrasonic receiver, wherein the ultrasonic transmitter and ultrasonic receiver are positioned so that the frequency passes through the unfixed tissue sample before encountering the receiver.

6. The method of claim 1, wherein the TOF calculation in step (b3) having a temporal resolution of a nanosecond.

7. The method of claim 1, wherein the transmitter and the receiver are transducers of an acoustic monitoring system, the acoustic monitoring system being operatively coupled to a computer system comprising a processor and computer-interpretable instructions on a computer-readable, non-transitory medium, the instructions causing the processor to process the measured phase shifts provided by the acoustic monitoring system and information on the plurality (N) of frequencies applied on the biological sample for performing step (b3).

8. The method of claim 7, wherein the transmitter comprises an ultrasonic transmitter; and wherein the receiver comprises an ultrasonic receiver.

9. The method of claim 1, further comprising: after determining that the calculated TOF has reached a predefined threshold value, fixing the tissue sample by actively or passively raising the temperature of the tissue sample; contacting the fixed tissue sample with a specific binding entity capable of binding to the labile biomarker; and detecting binding of the specific binding entity.

10. The method of claim 1, wherein the ToF is calculated using an envelope method of ToF calculation.

11. The method of claim 1, wherein the ToF is calculated using a curve fitting method of ToF calculation.

12. The method of claim 1, wherein the ToF is calculated using a linear regression method of ToF calculation.

13. The method of claim 1, wherein the fixative comprises neutral buffered formalin.

14. The method of claim 1, wherein the acoustic signal is an ultrasonic signal.

15. A method of fixing a tissue sample, said method comprising (a) obtaining a tissue sample sufficiently diffused with a cross-linking fixative solution by: (a1) immersing an unfixed tissue sample freshly obtained from a subject into a volume of the cross-linking fixative solution, said cross-linking fixative solution; (a2) tracking diffusion of the cross-linking fixative solution through the tissue sample by: (a2a) transmitting an acoustical signal from a transmitter through the tissue sample when the tissue sample is immersed in the cross-linking fixative solution; (a2b) detecting the transmitted acoustical signal after the transmitted acoustical signal has passed through the tissue sample; (a2c) calculating time of flight (ToF) of the acoustical signal on a computing system comprising a processor and (a2d) repeating (a2a)-(a2c) until the calculated ToF reaches a predefined threshold value, wherein the predefined threshold value indicates that the tissue sample is sufficiently diffused with the cross-linking fixative solution; (b) raising the temperature of the tissue sample after the tissue sample is sufficiently diffused with the cross-linking fixative solution to a temperature in the range of room temperature to 50° C., and holding the tissue sample in said range of temperatures for a period of time sufficient to allow fixation of the tissue sample and provide a fixed tissue sample.

16. The method of claim 15, further comprising detecting a labile biomarker in the fixed tissue sample by contacting the fixed tissue sample with a specific binding entity capable of binding to the labile biomarker and detecting binding of the specific binding entity.

17. The method of claim 16, wherein the labile biomarker is selected from the group consisting of a phosphorylated protein, an mRNA, and a miRNA.

18. The method of claim 15, wherein the ToF is calculated using an envelope method of ToF calculation.

19. The method of claim 15, wherein the ToF is calculated using a curve fitting method of ToF calculation.

20. The method of claim 15, wherein the ToF is calculated using a linear regression method of ToF calculation.

21. The method of claim 15, wherein the fixative comprises neutral buffered formalin.

22. A system for monitoring diffusion of a liquid into a tissue sample comprising: (a) a container for immersing the tissue sample in a volume of the liquid; (b) a transmitter arranged in or around the container in a position that permits transmission of the acoustical signal through the tissue sample when the tissue sample is immersed in the volume of liquid in the container; (c) a receiver arranged in or around the container at a fixed distance from the transmitter and positioned to receive the acoustical signal after the acoustical signal has been transmitted through the tissue sample; (d) a computing device communicatively coupled to the transmitter and receiver, the computing device configured to: (d1) calculate a time of flight (ToF) of the acoustical signal between the transmitter and receiver, by (d1a) transmitting a frequency sweep of the acoustical signal between a transmitter and a receiver, wherein the transmitter and receiver are positioned so that the frequency passes through the material before encountering the receiver; (d1b) detecting the frequency sweep of the acoustic signal with the receiver; (d1c) calculating time of flight of the acoustical signal by obtaining an error function of a frequency sweep of the acoustic signal; and, (d1d) generating an envelope of the error function, wherein the time-of-flight is based on a minimum of the error function; and, (d2) generate a signal when the ToF reaches a predetermined threshold.

23. The system of claim 22, wherein the liquid is a fixative.

24. The system of claim 22, wherein the ToF is calculated using an envelope method of ToF calculation.

25. The system of claim 22, wherein the ToF is calculated using a curve fitting method of ToF calculation.

26. The system of claim 22, wherein the ToF is calculated using a linear regression method of ToF calculation.

* * * * *